US010419990B2

(12) United States Patent
Uemura et al.

(10) Patent No.: US 10,419,990 B2
(45) Date of Patent: Sep. 17, 2019

(54) WIRELESS TERMINALS, BASE STATIONS, COMMUNICATION SYSTEMS, COMMUNICATION METHODS, AND INTEGRATED CIRCUITS

(71) Applicant: Sharp Kabushiki Kaisha, Osaka-shi, Osaka (JP)

(72) Inventors: Katsunari Uemura, Osaka (JP); Shohei Yamada, Osaka (JP); Yasuyuki Kato, Osaka (JP); Hidekazu Tsuboi, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 338 days.

(21) Appl. No.: 14/642,310

(22) Filed: Mar. 9, 2015

(65) Prior Publication Data

US 2016/0212664 A1 Jul. 21, 2016

Related U.S. Application Data

(60) Provisional application No. 62/104,637, filed on Jan. 16, 2015.

(51) Int. Cl.
  *H04W 24/08* (2009.01)
  *H04W 36/04* (2009.01)
  (Continued)

(52) U.S. Cl.
  CPC ............ *H04W 36/04* (2013.01); *H04W 24/08* (2013.01); *H04W 48/12* (2013.01); *H04W 48/02* (2013.01); *H04W 88/08* (2013.01)

(58) Field of Classification Search
  CPC ...... H04W 36/30; H04W 36/18; H04W 36/08; H04W 36/14; H04W 36/12; H04W 36/04; H04W 24/08; H04W 48/12
  See application file for complete search history.

(56) References Cited

U.S. PATENT DOCUMENTS

| 2014/0185548 A1* | 7/2014 | Lee | .................. H04W 48/20 370/329 |
| 2016/0205660 A1* | 7/2016 | Ryu | .................. H04W 36/30 455/458 |

(Continued)

OTHER PUBLICATIONS

3rd Generation Partnership Project: Technical Specification Group Radio Access Network, "Study on provision of low-cost Machine-Type Communications (MTC) User Equipments (UEs) based on LTE," 3GPP Technical Report 36.888, vol. 12.0.0, Jun. 2013, 55 pages.

(Continued)

*Primary Examiner* — Ted M Wang
(74) *Attorney, Agent, or Firm* — ScienBiziP, P.C.

(57) ABSTRACT

Wireless terminals, base stations, telecommunications systems, telecommunications methods, and integrated circuits whereby efficient selecting of network cells in which terminals are camped and made available. A base station transmits, respectively, first system information that relates to a cell-selection performed by conventional terminals, and second system information that relates to a cell-selection performed by terminals that support coverage enhancement, and a terminal considers cells to which the second system information is not transmitted as barred cells, and in a case where the second system information is transmitted, performs a cell-selection using cell-selection parameters that relate to coverage-enhancement cells.

11 Claims, 5 Drawing Sheets

(51) Int. Cl.
*H04W 48/12* (2009.01)
*H04W 88/08* (2009.01)
*H04W 48/02* (2009.01)

(56) References Cited

U.S. PATENT DOCUMENTS

2016/0337961 A1\* 11/2016 Hu .................... H04W 48/20
2016/0353342 A1\* 12/2016 Futaki ................ H04W 4/005

OTHER PUBLICATIONS

3GPP TSG-RAN WG1 Meeting #78bis, "Rel-12 agreements for MTC," R1-143784, Oct. 2014, 7 pages.
Huawei, Hisilicon, "SIB in "enhanced coverage mode"," 3GPP TSG-RAN WG2 #84, R2-133920, Available Online at http://www.3gpp.org/ftp/tsg_ran/WG2_RL2/TSGR2_84/docs/R2-133920.zip, Nov. 11, 2013, San Francisco, California, 3 pages.
Mediatek Inc, "Call selection and reselection for LC-MTC UE," 3GPP TSG-RAN #85bis Meeting, R2-141439, Available Online at http://www.3gpp.org/ftp/tsg_ran/WG2_RL2/TSGR2_85bis/docs/R2-141439.zip, Mar. 31, 2014, Valencia, Spain, 2 pages.
ZTE, "Considerations on common control messages for MTC enhancement," 3GPP TSG RAN WG1 Meeting #79, R1-144820, Available Online at http://www.3gpp.org/ftp/tsg_ran/WG1_RL1/TSGR1_79/Docs/R1-144820.zip, Nov. 17, 2014, San Francisco, California, 7 pages.

\* cited by examiner

WIRELESS TERMINALS, BASE STATIONS, COMMUNICATION SYSTEMS, COMMUNICATION METHODS, AND INTEGRATED CIRCUITS

CROSS REFERENCE TO RELATED APPLICATION

This application claims the benefit of U.S. Provisional Patent Application No. 62/104,637, filed Jan. 16, 2015, and entitled "Terminal Units, Base Station Apparatus, Communication Systems, Communication Methods, and Integrated Circuits," the entire contents of which are hereby incorporated herein by reference for all purposes.

BACKGROUND

1. Technical Field

The embodiments in the present disclosure relate to telecommunications terminal apparatuses, base station apparatuses, telecommunications systems, telecommunications methods and integrated circuits, for efficiently selecting network cells for camping terminals.

In the 3$^{rd}$ Generation Partnership Project (3GPP), which is a standardization project, by adopting the orthogonal frequency-division multiplexing (OFDM) communications scheme and flexible scheduling by predetermined frequencies and time units, called resource blocks, the standardization of Evolved Universal Terrestrial Radio Access (E-UTRA), realizing high-speed telecommunications, is being carried out. S-UTRA is sometimes also referred to as Long Term Evolution (LTE).

Also, with 3GPP, studies of LTE Advanced (also referred to as LTE-A), realizing higher-speed data transfer and possessing upper-level compatibility with respect to LTE, are underway.

With LTE Advanced, studies involving low-cost wireless terminal apparatuses using machine-type communication (MTC) or machine-to-machine communication (M2M) are being carried out (Non-Patent Document 1). In the following, wireless terminal apparatuses as well as telecommunications apparatuses designed for MTC/M2M and having cost-lowering functionality and/or functionality for supporting coverage enhancement will also be referred to as machine-type communication user equipment (MTCUE). Nevertheless, these types of wireless terminal applications are not limited to machine-type communication or machine-to-machine communication.

In 3GPP, proposals have been made in order to realize low-cost MTCUE including band narrowing of transmit/receive bandwidth, reduction of antenna port numbers/RF tuning numbers, reduction of transmit/receive data transmission rates, adoption of half-duplex frequency division duplex schemes, reduction of transmit/receive power, and prolongation of discontinuous reception intervals. Also, as means of realizing low-cost MTCUE, proposals have been made including reduction of maximum bandwidth in transmit/receive RF circuits and transmit/receive base-band circuits for MTCUE.

Meanwhile, in order to compensate for deterioration in reception/transmission qualities due to the impact of, for example, a reduction in the number of antenna ports, ideas such as repeatedly transmitting to the MTCUE the downlink data or the downlink signal for a one-time data transmission, or the MTCUE repeatedly transmitting to the base station apparatus the uplink data or the uplink signal for a one-time data transmission have been considered.

Furthermore, not only studies for cost-lowering, but also coverage-enhancement and coverage-improvement studies for enhancing the MTCUE transmit/receive range, or coverage, have been made. For example, the enhancing of coverage for spaces such as subterranean rooms, which have been an out of transmission-area due to the large signal attenuation, has been studied to date. For the sake of coverage enhancement, the base station repeatedly transmitting downlink data or downlink signals to the MTCUE, or the MTCUE repeatedly transmitting uplink data or uplink signals to the base station apparatus have been considered (Non-Patent Document 2).

For example, the base station repeats transmission on the physical reporting (broadcast) channel (PBCH) to the MTCUE multiple times within 40 ms. Further, in a random-access procedure the MTCUE repeatedly transmits the same random-access preamble using multiple resources on the physical random-access channel (PRACH). The base station that has received the random-access preamble repeatedly transmits a random-access response message. Here, the base station notifies cell-internal MTCUE of the number of repetitions (the number of attempts) using system information, and otherwise reports to the MTCUE individually (Non-Patent Document 2).

One challenge with enhancement of coverage has been that because it is synonymous with extending conventional cell areas, if criteria for conventional cell-selection and cell-reselection evaluation are followed, a cell in question may be determined to be out-of-service area due to low measurement quality, such that the cell cannot be camped on. Further, only the cells that support coverage enhancement may be accessible by the wireless terminal due to its low-cost functionality, and this issue ought to be considered during the cell selection or cell reselection process. These challenges remain unsolved.

2. Background Literature

NON-PATENT DOCUMENTS

Non-Patent Document 1: "Study on provision of low-cost Machine-Type Communications (MTC) User Equipments (UEs) based on LTE," 3GPP TR (Technical Report) 36.888, V 12.0.0 (June, 2013).

Non-Patent Document 2: "Rel-12 agreements for MTC," R1-143784, 3GPP TSG-RAN WG1 Meeting #78bis Ljubljana, Slovenia, Oct. 6-10, 2014.

SUMMARY

The present disclosure has the potential to address the above-described challenges by making available technology involving wireless terminals, base stations, telecommunications systems, telecommunications methods, and integrated circuits that enable the efficient selecting of network cells for camping on. The technology of the present disclosure may also address other challenges not discussed herein.

In view of the above, the following aspects of the present disclosure have been devised. According to a first aspect of the present disclosure, a terminal configured to connect with a base station provided, the terminal comprising instructions executable by a processor of the terminal to consider cells to which system information that relates to cell selection to coverage-enhancement cells is not transmitted as barred cells, and in a case where the system information that relates to cell selection to coverage-enhancement cells is transmitted, perform a cell-selection using cell-selection parameters that relate to coverage-enhancement cells.

Further, according to this first aspect, the terminal configured to connect with a base station may further comprise instructions executable by the processor of the terminal to, in situations where system information that relates to cell selection to coverage-enhancement cells is transmitted, perform the cell-selection using an offset value for a minimum required reception level that relates to the coverage-enhancement cell, and an offset value for a minimum required quality level that relates to the coverage-enhancement cell.

Further, according to this first aspect, the terminal configured to connect with a base station may further comprise instructions executable by the processor of the terminal to, in situations where system information that relates to cell selection to coverage-enhancement cells is transmitted, perform the cell-selection using a minimum required reception level that relates to the coverage-enhancement cells, and a minimum required quality level that relates to the coverage-enhancement cells.

Also, according to this first aspect, the terminal configured to connect with a base station may further comprise instructions executable by the processor of the terminal to, in a case where the system information that relates to cell selection to coverage-enhancement cells is transmitted, perform the cell-selection using cell-selection parameters corresponding to repetition levels based on cell measurement results.

According to a second aspect of the present disclosure, a base station configured to connect with terminals is provided, the base station comprising instructions executable by a processor of the base station to transmit, respectively, first system information that relates to a cell-selection performed by conventional terminals, and second system information that relates to a cell-selection performed by terminals that support coverage enhancement.

Further, according to this second aspect of the present disclosure, the base station configured to connect with terminals may further comprise instructions executable by the processor of the base station to transmit cell-selection parameters, as the second system information, corresponding to repetition levels based on cell measurement results.

According to a third aspect of the present disclosure, a telecommunications system including a base station and terminals is provided, wherein in the base station, first system information that relates to a cell-selection performed by conventional terminals, and second system information that relates to a cell-selection performed by terminals that support coverage enhancement are respectively transmitted; and in the terminals, cells to which the second system information is not transmitted are considered as barred cells, and in a case where the second system information is transmitted, a cell-selection using cell-selection parameters that relate to coverage-enhancement cells is performed.

According to a fourth aspect of the present disclosure, a telecommunications method for a terminal configured to connect with a base station is provided, which includes at least: considering cells to which system information that relates to cell selection to coverage-enhancement cells is not transmitted as barred cells; and, in a case where the system information is transmitted, performing a cell-selection using cell-selection parameters that relate to coverage-enhancement cells.

Further, according to the fourth aspect of the present disclosure, a telecommunications method for a terminal configured to connect with a base station is provided, the method further including, in a case where the system information that relates to cell selection to coverage-enhancement cells is transmitted, performing the cell-selection using cell-selection parameters corresponding to repetition levels based on cell measurement results.

According to a fifth aspect of the present disclosure, a telecommunications method for a base station configured to connect with a terminal is provided, the base-station communications method including at least a step of: transmitting first system information that relates to a cell-selection performed by conventional terminals; and transmitting second system information that relates to a cell-selection performed by terminals that support coverage enhancement.

Further, according to the fifth aspect of the present disclosure, the base-station communications method further includes transmitting as the second system information cell-selection parameters corresponding to repetition levels based on cell measurement results.

According to a sixth aspect of the present disclosure, an integrated circuit installed in a terminal configured to connect with a base station is provided, which is a terminal integrated circuit that executes in the terminal at least: a function of considering cells to which system information that relates to cell selection to coverage-enhancement cells is not transmitted as barred cells; and a function of, in a case where system information that relates to cell selection to coverage-enhancement cells is transmitted, performing a cell-selection using cell-selection parameters that relate to coverage-enhancement cells.

According to a seventh aspect of the present disclosure, an integrated circuit installed in a base station configured to connect with a terminal is provided, which is a base-station integrated circuit that executes in the base station at least: a function of transmitting first system information that relates to a cell-selection performed by conventional terminals; and a function of transmitting second system information that relates to a cell-selection performed by terminals that support coverage enhancement.

In the present specification, several embodiments are disclosed that relate to such technologies as wireless terminals, base stations, telecommunications systems, telecommunications methods, and integrated circuits for efficiently carrying out selection of cells for camping; however, it will be appreciated that the disclosed embodiments are not limited to telecommunications schemes that are employed in E-UTRA (LTE, LTE-A).

For example, technology taught in the present specification can be employed in a variety of telecommunications systems in which code division multiple access (CDMA), time division multiple access (TDMA), frequency division multiple access (FDMA), orthogonal FDMA (OFDMA), signal-carrier FDMA (SC-FDMA), or other access scheme is employed. Also, in the present specification "system" and "network" may be used synonymously.

According to embodiments set forth in the present disclosure, technology for wireless terminals, base stations, telecommunications systems, telecommunications methods, and integrated circuits that enables the efficient selecting of network cells for camping a terminal is made available.

It will be understood that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages or achieve any or all objects noted in any part of this disclosure.

DETAILED DESCRIPTION OF THE EMBODIMENTS

Figure 1:
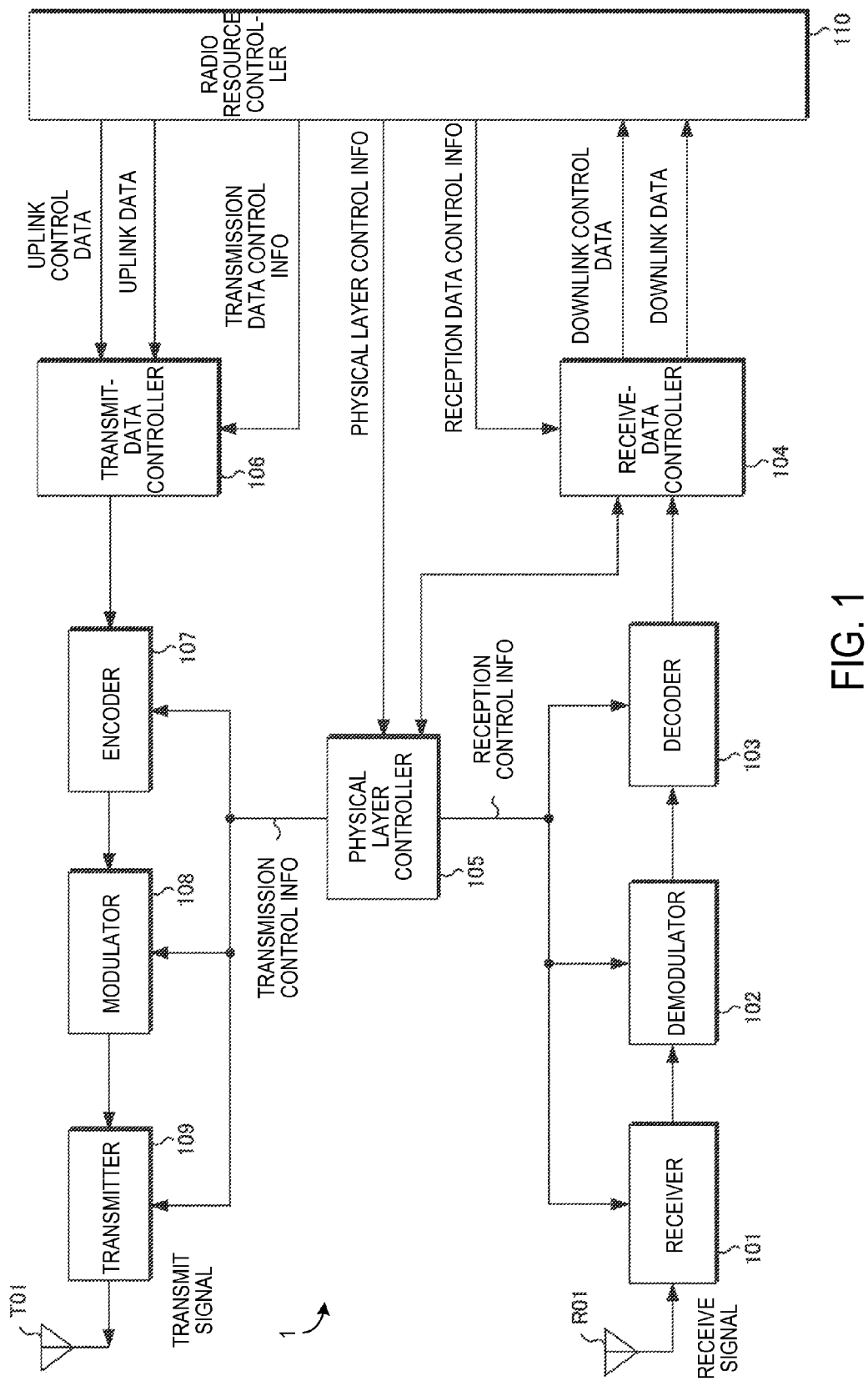
FIG. 1 is a block diagram representing one example of a wireless terminal configuration involving embodiments of the present disclosure.

In the following, a concise explanation of technology having to do with several embodiments in the present disclosure will be made.

Channels/Signals

Channels for LTE (E-UTRA) are configured from logical channels, transport channels, and physical channels. "Channels" mean media employed in signal transmission/reception, while "logical channels" define types of data transmission services that are transmitted/received on media access control (MAC) layers. "Transport channels" define what sort of characteristics data that is transmitted through a radio interface possesses, and how that data will be transmitted.

"Physical channels" mean physical media carrying data transferred on physical layers by transport channels. In the present disclosure, the term "physical channel" may be employed synonymously with "signal." It should be understood that in telecommunications systems in which E-UTRA (LTE, LTE-A) is being developed, the possibility exists that channel categories will be added, or that their structure (configuration) or formatting scheme will be changed or added to, but such cases will have no bearing on the present description of several embodiments of the present disclosure.

With E-UTRA, the scheduling of physical channels and/or physical signals are managed employing radio frames. One radio frame is 10 ms, and one radio frame is configured by 10 subframes. Further, one subframe is configured by two slots (that is, one subframe is 1 ms, and one slot is 0.5 ms). Also, they are administered employing resource blocks as minimum units of the scheduling according to which physical channels are allocated. "Resource blocks" are defined as uniform frequency domains in which the frequency axis is constituted by a collection of multiple subcarriers (e.g., 12 subcarriers), and as domains configured by uniform transmission time intervals (single slots).

To begin with, an explanation of downlinks in E-UTRA will be made. The logical channels for downlink include the broadcast control channel (BCCH), the paging control channel (PCCH), the common control channel (CCCH), the dedicated control channel (DCCH), and the dedicated traffic channel (DTCH).

The broadcast control channel BCCH is a logical channel employed for broadcasting system information. The paging control channel PCCH is a logical channel employed for transmitting paging information, and is used when the network pages a terminal apparatus and in cases involving the updating of system information. The terminal apparatuses (devices) are typically wireless terminals, and encompass mobile telephones and radio receiver and transceiver-equipped computer devices. Such devices may also be referred to as "user equipment," or "UEs". Hereinafter, the functions of the terminal devices are described by example with reference to wireless terminals. Also the base station apparatuses (devices) are typically base stations, and encompass radio receiver and transceiver-equipped computer devices. Such devices may also be referred to as "e-NodeB," or "eNBs". Hereinafter, the functions of the base station devices are described by example with reference to base stations. The common control channel CCCH is a logical channel employed in order to transmit control information between wireless terminals and a network, and is used by a base station in situations where in the downlink, the state of a wireless terminal has not transitioned to a state of being radio-resource-control connected (RRC connected state; RRC-connected) with the network.

The dedicated control channel DCCH, a point-to-point bidirectional channel, is a logical channel employed in order to transmit specific control information between wireless terminals and a network. The dedicated control channel DCCH may be employed in between a wireless terminal in an RRC connected state and a base station. The dedicated traffic channel DTCH, a point-to-point bidirectional channel, being a channel dedicated to a single given wireless terminal, is a logical channel employed for in order to forward (transmit) user information (unicast data).

Downlink transport channels include the broadcast channel (BCH), the paging channel (PCH), and the downlink shared channel (DL-SCH).

With the broadcast channel BCH, broadcasting is to the cells in their entirety according to a fixed, predefined format (transport format). With the downlink shared channel DL-SCH, hybrid automatic repeat requests (HARQs), dynamic adaptive modulation (link adaptation) control, dynamic or quasi-static resource allocation, and discontinuous reception (DRX) are supported. Likewise, with the paging channel PCH, broadcasting is to the cells in their entirety, and the channel supports discontinuous reception.

An explanation of the downlink physical channels and physical signals in E-UTRA will be made.

Synchronization signals consist of three types of primary synchronization signals (PSSs), and secondary synchronization signals (SSSs) made up of codes of 31 kinds distributed in mutually differing frequency domains, and by combining primary synchronization signals and secondary synchronization signals, 504 varieties of physical cell identities (PCIs) for identifying base stations, and frame timings for radio synchronization are expressed. Wireless terminals designate physical cell identities in synchronization signals received by means of cell searches.

Downlink reference signals are classified into a number of types depending on the application. For example, cell-specific reference signals (CRSs), pilot signals transmitted to each cell at a predetermined power, are downlink reference signals that are repeated periodically in frequency domains and time domains based on predetermined rules.

Wireless terminals can measure cell-by-cell reception quality by receiving the cell-specific reference signals. Also, wireless terminals can use cell-specific reference signals as comparison signals for demodulation of physical downlink control channels or physical downlink shared channels transmitted together with the cell-specific reference signals.

For the sequences used in the cell-specific reference signal, a sequence enabling cell-by-cell identification is employed. The cell-specific reference signal may be transmitted from a base station in all of the downlink frames, or may be transmitted only in downlink subframes designated by a base station. Likewise, the wireless terminals may receive cell-specific reference signals in all of the downlink subframes, or may receive them only in downlink subframes designated by a base station.

Furthermore, downlink reference signals are also employed to estimate propagation-path fluctuations in the downlink. The downlink reference signals employed in estimating propagation-path fluctuations are referred to as channel-state information reference signals (CSI-RS, or CSI reference signals). Also, with CSI reference signals, a signal may not be actually transmitted, or else may be transmitted at zero power. On the other hand, CSI reference signals that are an actual transmission of a signal may be referred to as nonzero power channel-state information reference signals (nonzero power CSI reference signals, or NZP CSI-RS). Furthermore, downlink radio resources that are employed in order to measure interference components may be referred to as channel-state information interference measurement resources (CSI-IR) or otherwise as CSI-IM resources.

In addition, downlink reference signals established individually for wireless terminals are referred to as UE-specific reference signals (URSs) and demodulation reference signals (DMRSs), and are referred to for the sake of a channel propagation-path compensation process during demodulation of physical downlink control channels, enhancement physical downlink control channels, as well as physical downlink shared channels.

The physical broadcast channel (PBCH) is transmitted with the objective of broadcasting (configuring) a master information block (MIB), used in common by the wireless terminals within a cell. Base stations broadcast (transmit) a master information block message containing MIB by means of the physical broadcast channel. The information that is broadcasted to (configured in) the wireless terminals by the master information block message, that is, the information that is notified by MIB, is configuration information such as downlink frequency bandwidth, system frame numbers, and physical channels (PHICHs) relating to hybrid ARQs.

Using a system-information block Type 1 (SIB1) message whose subframe position and period is statically predefined, and system information messages of other types (e.g., system information block Type 2 through Type n (n being a natural number)) dynamically scheduled within system windows (SI-windows) designated by the system information block Type 1's, base stations transmit to wireless terminals cell-common information apart from the master information block.

Herein, the master information block message, the system information block Type 1 message, and system information messages are each Layer 3 messages (RRC messages). It should be understood that in the present specification, "system information (broadcast information)" in some cases means these RRC messages, and in others, information (information elements) that is broadcasted by the master information block and each of the system information blocks.

System information messages are broadcasted using the physical downlink shared channel in the radio resources indicated by the physical downlink control channel, and are transmitted within a system information window corresponding to the system information (system information block Type 2 through Type n (SIB2 through SIBn (n being a natural number)) classified in accordance with the objective.

Broadcasted as system information are, for example, cell global identifiers (CGIs) that indicate cell individual identifiers, tracking area identifiers (TAIs) for paging-based administering of camp on areas, random-access configuration information, timing adjustment information, common radio-resources configuration information for every cell, same-frequency (different-frequency, different-RAT) neighboring-cell list information, and uplink access restriction information.

The physical downlink control channel (PDCCH) is transmitted with several OFDM symbols (e.g., 1 to 4 OFDM symbols) from the beginning of each subframe. The enhanced physical downlink control channel (EPDCCH) is a physical downlink control channel mapped to the OFDM symbol to which the physical downlink shared channel PDSCH is mapped. PDCCH as well as EPDCCH are used with the objective of informing information such as radio-resource allocation information in accordance with base-station scheduling of wireless terminals, and control information instructing transmission-power increase/decrease adjustment level. Below, instances where simply "physical downlink control channel" (PDCCH) is mentioned mean, unless specifically denoted otherwise, both PDCCH and EPDCCH physical channels.

A wireless terminal is configured to monitor the physical downlink control channel for the device prior to transmitting/receiving Layer 2 messages (MAC-CE) and Layer 3 messages (paging, system information, etc.), and by receiving the physical downlink control channel for the device, to acquire radio-resource allocation information, called "uplink grant" for transmission and "downlink grant" for reception (also referred to as downlink assignment), from the physical downlink control channel. It should be noted that it is possible to configure the physical downlink control channel in such a way that, other than being sent with the above-described OFDM symbols, it is transmitted with the resource-block domain allocated individually (dedicated) to the wireless terminal through the base station.

The physical downlink shared channel (PDSCH) is employed in order to report to a wireless terminal, in addition to downlink data, Layer 3 messages such as paging and system information. Radio-resource allocation information in the physical downlink shared channel is indicated (notified) with the physical downlink control channel. The physical downlink shared channel is transmitted and mapped to an OFDM symbol other than the OFDM symbol with which the physical downlink control channel is transmitted. That is, the physical downlink shared channel and the physical downlink control channel are time division-multiplexed within a single subframe.

The broadcast channel BCH is mapped onto the physical broadcast channel PBCH. The paging channel PCH and the downlink shared channel DL-SCH are mapped onto the physical downlink shared channel PDSCH. The physical downlink control channel PDCCH is used with a physical channel singularly.

And in the downlink, the paging control channel PCCH is mapped onto the paging channel PCH. The broadcast control channel BCCH is mapped onto the broadcast channel BCH and the downlink shared channel DL-SCH. The common control channel CCCH, dedicated control channel DCCH, and the dedicated traffic channel DTCH are mapped onto the downlink shared channel DL-SCH.

Next, the uplink in E-UTRA will be described. The uplink's logical channels include a common control channel CCCH, a dedicated control channel DCCH, and a dedicated traffic channel DTCH.

The common control channel CCCH is a logical channel employed in order to transmit control information between wireless terminals and a network, and is used by wireless terminals in situations where in the uplink, the state of a wireless terminal has not transitioned to being a state in which it is radio-resource-control connected (RRC connected state; RRC-connected) with the network.

The dedicated control channel DCCH, a point-to-point bidirectional channel, is a logical channel employed in order to transmit individual control information between a wireless terminal and a network. The dedicated control channel DCCH may be employed between a wireless terminal in an RRC connected state and a base station. The dedicated traffic channel DTCH, a point-to-point bidirectional channel, being a channel dedicated to a single wireless terminal, is a logical channel employed in order to forward user information (unicast data).

Contained in the transport channel for the uplink are the uplink shared channel (UL-SCH), and the random access channel (RACH).

Hybrid automatic repeat requests (HARQs), dynamic adaptive modulation control, dynamic or quasi-static resource allocation, and discontinuous transmission (DTX) are supported with the uplink shared channel (UL-SCH). With the random access channel (RACH), limited control information is transmitted.

Uplink physical channels and physical signals for E-UTRA will be described.

The physical uplink control channel (PUCCH) is employed for downlink-data reception confirmation responses (acknowledgments/negative acknowledgments ACK/NACK) and downlink propagation-path (channel state) information (CSI) transmitted on the physical downlink shared channel, and in order to carry out radio-resource allocation requests (radio resource request or scheduling request (SR)) in the uplink.

CSI includes a channel quality indicator (CQI), a pre-coding matrix indicator (PMI), a pre-coding type indicator (PTI), and rank indicators (RI). In each case "indicator" may be written "indication".

The physical uplink shared channel (PUSCH) transmits uplink data or uplink control data principally, and is capable of containing control data such as CSI or ACK/NACK. It is also employed for reporting, in addition to uplink data, uplink control information as Layer 2 messages or Layer 3 messages from wireless terminals to a base station. And in the same way as with downlink data, radio resource-allocation information in the physical uplink shared channel is indicated in the physical downlink control channel.

Uplink reference signals (also named "uplink pilot signals" or "uplink pilot channels") contain demodulation reference signals (DMRS), which a base station employs in order to demodulate physical uplink control channels PUCCH and/or physical uplink shared channels PUSCH, and sounding reference signals (SRS), which a base station principally uses in order to infer a channel state in an uplink.

Also, with sounding reference signals there are periodic sounding reference signals (periodic SRSs), which are transmitted periodically, and aperiodic sounding reference signals (aperiodic SRSs), which are transmitted from a base station when instructed.

The physical random-access channel (PRACH) is a channel employed for notifying (configuring) preamble sequence, and includes guard times. Preamble sequences are constituted so as to indicate information to base stations according to a plurality of sequences. For example, in a case where 64 types of sequences have been prepared, 6-bit information can be expressed to a base station. The physical random-access channel is used as a means for a wireless terminal to access a base station.

Purposes for the usage of the physical random-access channel by wireless terminals include in order to request radio resources in the uplink when the physical uplink control channel has not been configured, and in order to request timing adjustment information (also called "timing advance", or "TA") from a base station in order to match uplink transmission timings to base-station receiving timing windows. Also, a base station can use the physical downlink control channel to request from a wireless terminal the commencement of a random-access procedure.

In the uplink, the common control channel CCCH, the dedicated control channel DCCH, and the dedicated traffic channel DTCH are mapped to the uplink shared channel UL-SCH.

The uplink shared channel UL-SCH is mapped onto the physical uplink shared channel PUSCH. The random access channel RACH is mapped onto the physical random access channel PRACH. The physical uplink control channel PUCCH is used with a physical channel singularly.

It should be understood that detailed description of physical channels and physical signals other than those discussed in the foregoing will be omitted because they do not have any strong relation with the embodiments of the present disclosure. Examples of physical channels as well as physical signals whose description is herein omitted include the physical control format indicator channel (PCFICH), the physical hybrid ARQ indicator channel (PCHICH), and the physical multicast channel (PMCH).

Similarly, description of logical channels for direct communications between wireless terminals (device-to-device, "D2D"), of transport channels, and of physical channels as well as physical signals (which are also referred to collectively as "side-link channels") will be omitted although the channels and signals are also used in EUTRA.

Protocol Stack

The protocol stack that handles mobile-terminal and base-station control data is categorized into the physical (PHY) layer, the MAC layer, the RLC layer, the PDCP layer, and the RRC layer. The protocol stack that handles wireless terminal and base-station user data is categorized into the physical layer, the MAC layer, the RLC layer, and the PDCP layer.

The physical layer (PHY layer) uses a physical channel to provide services for transporting to upper layers. The PHY layer is connected with the media access control layer (MAC layer) in a level above through a transport channel. Data travels interlayer between the MAC layer and the PHY layer via a transport channel. In between PHY layers for wireless terminals and base stations, the transmitting/receiving of data is carried out via a physical channel. Is to be noted that in each hierarchical level there may be a plurality of entities that execute the roles for each hierarchical level.

With the MAC layer, mapping of diverse logical channels onto transport channels is carried out. Through a logical channel, the MAC layer is connected with a radio link control (RLC) layer in a level above. The logical channel, grossly divided according to the type of information transferred, is separated into a control channel that transfers control information, and a traffic channel that transfers user information. Functionality that the MAC layer possesses includes a function of performing control of the PHY layer in order to carry out discontinuous reception (DRX) and discontinuous transmission (DTX), a function of reporting transmission-power information, and a function of carrying out HARQ control.

The MAC layer also possesses functionality for reporting transmission-buffer data volume corresponding to each logical channel (buffer status reports; BSRs), and functionality for making radio-resource requests in order to transmit uplink data (scheduling requests). With the MAC layer, a random-access procedure is executed when initial access, scheduling, etc. is carried out.

The MAC layer additionally possesses functionality for carrying out control of the PHY layer in order to perform cell activation/deactivation when carrier aggregation for transmitting using a plurality of cells is carried out, and functionality for controlling the PHY layer in order to administer transmission timing on the uplink.

With the RLC layer, data received from an upper layer is segmented and concatenated to regulate the data size so that lower layers may transmit data appropriately. The RLC layer also possesses functionality in order to guarantee the quality of service (QoS) that that the various data require. That is, the RLC layer possesses functionality for the retransmission control etc. of data.

The packet data convergence protocol layer (PDCP) possesses header compression functionality for carrying out compression of unnecessary control information in order efficiently to transfer within a radio zone the IP packets that are user data. The PDCP layer also possesses data-encrypting functionality.

With the radio resource control layer (RRC layer), only control information is defined. The RRC layer carries out establishing/reestablishing of the radio bearer (RB), and controls logical channels, transport channels, and physical channels. RBs are divided into signaling radio bearers (SRBs) and data radio bearers (DRBs), with SRBs being used as channels for transmitting Layer 3 messages that are control information. DRBs are employed as channels for transmitting user information. The establishing of each RB is carried out in the RRC layer between a base station and wireless terminals.

Layer 3 messages are messages handled with control-plane (C-plane; CP) protocols that are exchanged on the radio-resource control (RRC) layer between wireless terminals and a base station, and can be used synonymously with RRC signaling or RRC messages. It should be noted that the protocol for handling user data on the control plane is referred to as the user plane (U-plane; UP).

Coverage Enhancement

Wireless terminals (MTCUEs) that can handle enhancement of coverage (that support coverage enhancement) expand coverage in the uplink by repeating transmission a plurality of times over a plurality of subframes per a given transmission to base station. Wireless terminals (MTCUEs) supporting coverage enhancement also extend coverage in the uplink by repeating reception a plurality of times over a plurality of subframes per a given reception from a base station.

In other words, in order to compensate for the signal attenuation associated with expansion of coverage, the base stations and wireless terminals receive signals over a plurality of subframes and accumulate received signals, thereby improving reception quality.

For example, through system information the base station may broadcast the repetition number of uplink transmission or the repetition number of downlink reception, or else the repetition number that is applied in both directions. And when transmitting a random access preamble, the wireless terminal (MTCUE) may select one of the repetition number of transmission from a plurality of types of the repetition number of transmission, based on either the system information or on measurement quality, or on both.

It should be understood that controlling of repetitions with respect to the physical downlink control channel PDCCH, the enhanced physical downlink control channel EPDCCH, the physical uplink control channel PUCCH, and the physical random access channel PRACH may be referred to as "repetition," while controlling of repetitions with respect to the physical downlink shared channel PDSCH, and the physical uplink shared channel PDUSCH may be referred to as "bundling."

When bundling is configured, the bundle size defines the subframe number of a single bundle. The bundling operation (process) relies on an HARQ entity for invoking the same HARQ process for each of the transmissions that constitute the same bundle. Within a single bundle, HARQ retransmissions are non-adaptive and, according to the bundle size, are triggered without waiting for feedback from the previous transmissions. The HARQ feedback for a single bundle is received (HARQ-ACK for PUSCH) or transmitted (HARQ-ACK for PDSCH) by a wireless terminal only with respect to the last subframe in the bundle. The bundling process is carried out in the MAC layer.

The base station may be designed so as to configure a plurality of repetition number (repetition configuration) corresponding to repetition level as well as to bundling size. For example, it may be configured (notified) that the repetition number is eight times in a case where the repetition level (bundling size) is 1, and the repetition number is 16 times in a case where the repetition level is 2, and the repetition number is 32 times in a case where the repetition level is 3. The base station may configure different values (repetition number) based on the size of the transmission data. The base station may configure different values (repetition number) on a per physical channel basis. Furthermore, the base station may configure different values (repetition number) on a per logical channel or a per logical channel group basis. The base station may transmit repetition level information or bundling size information to the wireless terminals by using dedicated RRC messages.

The transmission of the system information that is broadcast is carried out periodically in the RRC level. In the transmission of the respective system information items, an HARQ retransmission process is carried out in the MAC layer. Repetition control of reception in the physical downlink control channel PDCCH, of reception in the enhanced physical downlink control channel EPDCCH, of transmission in the physical uplink control channel PUCCH, and of transmission in the physical random-access channel PRACH (or else of the random access preamble) is carried out in the PHY layer.

Also, a dedicated physical downlink control channel for MTCUEs (MPDCCH) may be defined. In that case, some or all of the roles of the PDCCH and/or the EPDCCH with respect to the MTCUEs may be fulfilled by the MPDCCH.

In the following, taking the foregoing items into consideration, an explanation will be made in detail, while referring to the attached drawings, of suitable embodiments of the present disclosure. It should be understood that in the description of embodiments of the present disclosure, where it has been judged that specific explanation with regard to publicly known functions and configurations having a relation to the subject embodiments would render obscure the purport of the embodiments, detailed description thereof will be omitted.

First Embodiment

A first embodiment of the present disclosure will be described in the following.

FIG. 1 is a block diagram representing one example of a wireless terminal 1 in a first embodiment of the present disclosure. The wireless terminal 1 comprises at least a receiver 101, a demodulator 102, a decoder 103, a receive-data controller 104, a physical layer controller 105, a transmit-data controller 106, an encoder 107, a modulator 108, a transmitter 109, a radio resource controller 110, a transmit antenna T01, and a receive antenna R01. Within the figure, the "-er's" are elements, expressed by terminology such as "section," "circuit," "configurational device," "microelectronic device," and "unit," that realize functions of, and the different procedures in, the wireless terminal 1.

It should be understood that the wireless terminal 1 being able to handle enhancement of coverage (supporting coverage enhancement, coverage-enhancement handling) hereinafter will in some cases be described simply as "wireless terminal 1" for short. Also, the wireless terminal 1 may be divided into two or three types. A first type of wireless terminal, being a terminal classified into one of the conventional categories (0 to 13), may be a low-cost MTC-dedicated wireless terminal, or may not be an MTC-dedicated wireless terminal.

A second type of wireless terminal is a wireless terminal 1 that at least possesses a restriction to the system bandwidth that is supported by the downlink, that is, a wireless terminal 1 that supports a system bandwidth of less than 20 MHz (e.g. 1.4 MHz). The second type of wireless terminal may include a wireless terminal 1 that supports coverage enhancement of a certain repetition level (bundling size). For example, a wireless terminal 1 that supports only coverage enhancement whose repetition level is 1 may be categorized as a second type. The second type of wireless terminal may be classified into a category (for example, "Category X") other than the categories that are indicated by the first type of wireless terminals.

Herein, "wireless terminal that handles coverage enhancement" indicates a wireless terminal 1 at least capable of a repetition transmitting process and/or a repetition receiving process, obeying a system, specifications, or predetermined rules (regulations, configuration (information elements)) that are notified from the base station 2, regardless of whether the coverage is actually enhanced. That is, such wireless terminal 1 supports various functions that are newly added for the sake of the repetition transmitting process and/or the repetition receiving process (for example, a part or all of procedures (functions) such as a measurement procedure, a cell selection procedure, a cell reselection procedure, a synchronization procedure, a paging procedure, a system information acquisition procedure, an RRC connection procedure, a handover procedure, and a random-access procedure).

Likewise, "base station that handles coverage enhancement" (base station (cell) that supports coverage enhancement) indicates a base station 2 at least capable of a repetition transmitting process and/or a repetition receiving process, obeying a system, specifications, or predetermined rules (regulations, configurations (information elements)) that are determined between and operator and a base station 2, regardless of whether the coverage is actually enhanced. And such base station 2 (cell) supports various functions that are newly added to the wireless terminal 1 for the sake of the repetition transmitting process and/or the repetition receiving process (for example, a part or all of procedures (functions) such as an measurement procedure, a cell selection procedure, a cell reselection procedure, a synchronization procedure, a paging procedure, a system information acquisition procedure, an RRC connection procedure, a handover procedure, and a random-access procedure).

The third type of wireless terminal is a wireless terminal 1 that supports coverage enhancement for all repetition levels (bundling sizes). The third type of wireless terminal may be classified into a category (for example, "Category Y") other than the categories that are indicated by the first type of wireless terminals and the second type of wireless terminals. So the maximum number of repetition that is supported by second type of wireless terminal may be smaller than that for third type of wireless terminal. The functions that are supported by each type differ, and their applications need not be limited to MTC (MTC services). This means that in instances where "MTCUE" is written in the present specification, the equipment's applications are not limited to MTC.

The radio resource controller 110 executes its functions on the RRC layer that is for performing wireless resource control of the wireless terminal 1. And the receive data controller 104 and the transmit-data controller 106 execute their functions in the MAC, RLC, and PDCP layers that are for administering data link layers.

It will be appreciated that the wireless terminal 1, in order to support receive processes and transmit processes in parallel (concurrently) for a plurality of frequencies (frequency bands, frequency bandwidths) or within the same subframe of a given single cell, may be configured by providing it multiply with some or all of the receive-system blocks (receiver 101, demodulator 102, decoder 103, and receive antenna R01), and the plurality of frequencies (frequency bands, frequency bandwidths), and the transmit-system blocks (encoder 107, modulator 108, transmitter 109, and transmit antenna T01).

With regard to the reception processes in the wireless terminal 1, reception data control information is input into the receive-data controller 104 by the radio resource controller 110, and physical-layer control information—control parameters for controlling each of the blocks—is input into the physical layer controller 105. The physical-layer control information is information, constituted by reception control information and transmission control information, containing a parameter configuration used for radio communication control in the wireless terminal 1.

The physical-layer control information is configured by items including radio-resource connection configurations that are transmitted individually (dedicatedly) to the wireless terminal 1 from the base station 2, cell-specific broadcast information, as well as system parameters, and is input into the physical layer controller 105 as the radio resource controller 110 requires. The physical layer controller 105 inputs the reception control information—control information relating to reception—into the receiver 101, the demodulator 102, and the decoder 103 as appropriate.

The reception control information may contain information, as downlink scheduling information, such as receive-frequency band information, reception timing relating to the physical channel and the physical signal, multiplexing method, and radio-resource control information. Also, the reception data control information is downlink control information containing items such as secondary-cell deactivation timer information, DRX control information, multicast data receive information, downlink retransmission control information, and control information relating to repetition reception, with control information relating to downlinks in, respectively, the MAC layer, the RLC layer, and the PDCP layer being included.

Receive signals are received in the receiver 101 by way of the receive antenna R01. The receiver 101 receives signals from the base station 2 (or from other nodes, including the wireless terminal 1) in accordance with the frequency and frequency bandwidth notified by the reception control information. The received signals are input into the demodulator 102. The demodulator 102 carries out demodulation of the signals. The demodulator 102 inputs the post-demodulation signals into the decoder 103.

The decoder 103 decodes the input signals and inputs the decoded data items (also referred to as downlink data, downlink control data, downlink transport blocks (TBs), or downlink protocol data units (PDUs)), into the receive-data controller 104. Further, together with each of the data items, the MAC control elements (MAC-CEs) transmitted from the base station 2 are also decoded in the decoder 103, and the relevant data is input into the receive-data controller 104.

The receive-data controller 104 carries out control of the physical layer controller 105 (e.g., cell activation/deactivation, DRX control, transmission timing adjustment, etc.) based on the received MAC control elements, and performs buffering of the decoded data items, and error-correction control (HARQ) of retransmitted data. Among the data items inputted into the receive-data controller 104, relevant data is input into (forwarded to) the radio resource controller 110.

Also, through the reception timing in the synchronizing signal received by the receiver 101 etc., the receive-data controller 104 adjusts the reception timing for the wireless terminal 1 (frame synchronization, subframe synchronization, symbol synchronization etc.). With the reception timing, by its being administered and fed back to the receiver 101 or the transmitter 109, the downlink synchronization and/or uplink synchronization are appropriately adjusted.

Further the receive-data controller 104 may measure the reception quality (RSRP, RSSI, RSRQ) of the downlink reference signals that are the signals for the known sequences, and announce the measurement results to the radio resource controller 110. The measurement interval for reception quality may be configured based on the repetition configuration, or may be notified or made known by an RRC message from the base station 2. The radio resource controller 110 may determine the repetition number of transmission for coverage enhancement, based on the announced reception quality.

Also, regarding the transmission processes in the wireless terminal 1, transmission data control information is input into the transmit-data controller 106 from the radio resource controller 110, and physical-layer control information—control parameters for controlling each of the blocks—is input into the physical layer controller 105. The physical layer controller 105 inputs the transmission control information, control information relating to transmission, into the encoder 107, the modulator 108, and the transmitter 109 as appropriate.

The transmission control information contains information, as uplink scheduling information, such as including information modulating information transmit-frequency band information, timing information (or TA) relating to the physical channel and the physical signal, multiplexing method, and radio-resource distribution information.

Also, the transmission data control information, being control information for the uplink, includes, inter alia, DTX control information, random-access configuration information, uplink shared-channel information, logical channel priority information, resource-request configuration information, cell group information, uplink retransmission control information, buffer status reports, and control information relating to repetition transmission. The radio resource controller 110 may configure a plurality of random access configuration information items corresponding to each of the plurality of cells in the transmit-data controller 106.

Further, the radio resource controller 110 administers timing adjustment information and transmission-timing timers used in adjusting the uplink transmission timings, and administers the uplink transmission timings states (transmission-timing adjusted state as well as transmission-timing unadjusted state) on a per cell basis (or in a per cell group basis, or a per TA group basis). The timing adjustment information and the transmission-timing timers are contained in the transmission data control information.

It should be noted that in cases where administering a plurality of uplink-transmission timing states is required, the transmit-data controller 106 administers timing adjustment information for handling uplink transmission timings in a plurality of respective cells (or cell groups, or TA groups). Contained in the resource-request configuration information is at least maximum transmission-counter configuration information, and radio-resource-request prohibit timer information. The radio resource controller 110 may establish in the transmit-data controller 106 a plurality of resource-request configuration information items corresponding respectively to the plurality of cells.

Transmission data arising in the wireless terminal 1 (also referred to as uplink data, uplink control data, uplink transport blocks (TBs), or uplink protocol data units (PDUs)) is input into the transmit-data controller 106 from the radio resource controller 110 (or else an upper layer unit such as a (not-illustrated) non-access layer layering unit) at an arbitrary timing. It is to be noted that the transmission data is processed in each layer in units that are, respectively, RRC PDUs, PDCP PDUs, RLC PDUs, and MAC PDUs. At that time, the transmit-data controller 106 calculates the size of transmission data that has been input (uplink buffer size). Also, the transmit-data controller 106 has functionality for discriminating whether the inputted transmission data is data that belongs to the control plane or the user plane.

Also, when transmit data has been inputted, the transmit-data controller 106 stores the transmission data in a (not-illustrated) uplink buffer within the transmit-data controller 106. Further, the transmit-data controller 106 carries out multiplexing and assembly based on priority level etc. of the transmission data stored in the uplink buffer, and generates the MAC PDU. The transmit-data controller 106 then judges whether the radio resources required for transmitting the inputted transmission data have been allocated to the wireless terminal 1.

Based on the radio resource allocation, the transmit-data controller 106 selects one of either a radio-resource request using the physical uplink shared channel PUSCH and the physical uplink control channel (SR-PUCCH), or a radio-resource request using the physical random access channel, and requests of the physical layer controller 105 a control process for transmitting the selected channel.

Herein, the transmit-data controller 106 generates a buffer status report based on the inputted transmission data. In other words the transmit-data controller 106 generates, as a MAC control element, the buffer status report based on ordinary transmission data buffer size.

The transmit-data controller 106 also may configure the repetition number of transmission for the wireless terminal itself, based on the repetition configuration inputted from the radio resource controller 110. The repetition configuration may be configured in physical channel units or logical channel (logical channel group) units.

Also, the encoder 107 appropriately encodes, and inputs into the modulator 108, each of data items based on the transmission control information. The modulator 108 carries out an appropriate modulation process based on the structure of the channel in which the encoded data items are transmitted. The transmitter 109 maps each of the demodulation-processed data items onto frequency domains, and at the same time converts the frequency-domain signals into time-domain signals, puts the signals onto a carrier wave of a defined frequency and performs power amplification for the signals. The transmitter 109 also adjusts the uplink transmission timing in accordance with per-cell (or else per cell group, or per TA group) timing adjustment information inputted by the radio resource controller 110, and transmits the signals by way of the transmit antenna T01.

The physical uplink shared channel in which the uplink control data is distributed can include, in addition to user data, Layer 3 messages (radio resource control messages, RRC messages), for example.

In FIG. 1, other configurational elements of the wireless terminal 1 and inter-configurational-element data (control information) propagation paths are omitted, yet it should be apparent that wireless terminal 1 possesses, as configurational elements, a number of blocks having those other functions necessary in order for it to operate as a wireless terminal. For example, in the upper layers of the radio resource controller 110, a non-access stratum layer unit for performing control functions with the core network, and an application layer unit are present.

Figure 2:
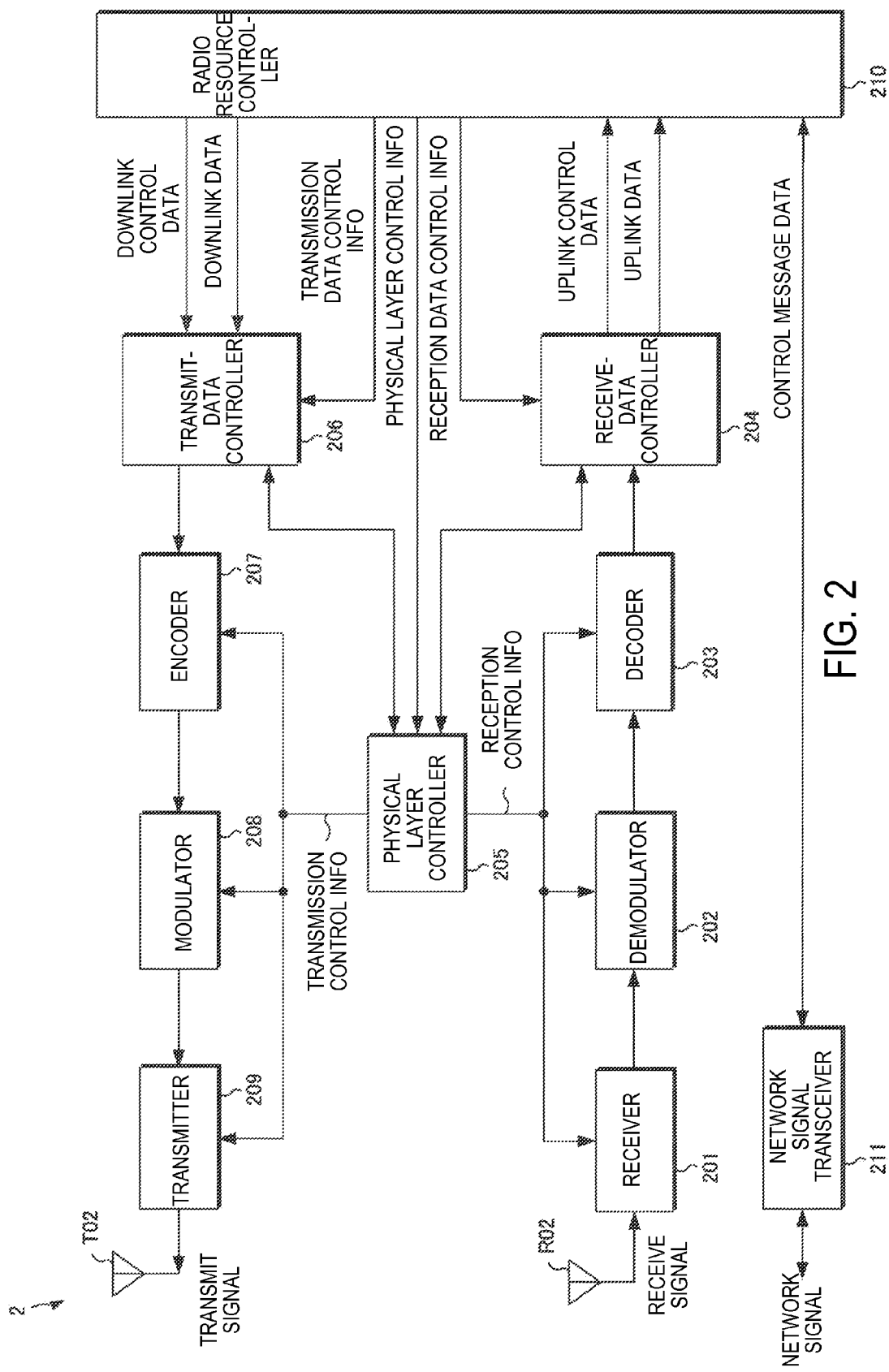
FIG. 2 is a block diagram representing one example of a base station configuration involving embodiments of the present disclosure.

FIG. 2 is a block diagram representing one example of a base station 2 according to the first embodiment of the present disclosure. The present base station comprises at least a receiver 201, a demodulator 202, a decoder 203, a receive-data controller 204, a physical layer controller 205, a transmit-data controller 206, an encoder 207, a modulator 208, a transmitter 209, a radio resource controller 210, a network signal transceiver 211, a transmit antenna T02, and a receive antenna R02. Within the figure, the "-er's" are elements, expressed by terminology such as "section," "circuit," "configurational device," "microelectronic device," and "unit," that realize functions of, and the different procedures in, the base station 2.

The radio resource controller 210 executes the different functions in the RRC layer for performing radio-resource control of the base station 2. Likewise, the receive-data controller 204 and the transmit-data controller 206 execute the different functions in the MAC layer, the RLC layer, and the PDCP layer, where datalink layers are administered.

It will be appreciated that the base station 2, in order to support a plurality of frequencies (frequency bands, frequency bandwidths) owing to carrier aggregation, or transmission/reception processes within the same subframe of a cell, may be configured by providing it multiply with some or all of the receive-system blocks (receiver 201, demodulator 202, decoder 203, and receive antenna R02), and the transmit-system blocks (encoder 207, modulator 208, transmitter 209, and transmit antenna T02).

The radio resource controller 210 inputs the downlink data and the downlink control data into the transmit-data controller 206. In cases where a MAC control element for transmission to the wireless terminal 1 is present, the transmit-data controller 206 inputs the MAC control element and the data items (downlink data as well as downlink control data) into the encoder 207.

The transmit-data controller 206 also may configure the repetition number of transmission for the base station itself, based on the repetition configuration inputted from the radio resource controller 210. The repetition configuration may be configured in physical channel units or logical channel (logical channel group) units.

Also, the encoder 207 encodes, and inputs into the modulator 208, the inputted MAC control element and each data. The modulator 208 carries out a process of modulating the encoded signals. These signals modulated in the modulator 208 are input into the transmitter 209. After mapping the inputted signals onto frequency domains, the transmitter 209 converts the frequency-domain signals into time-domain signals, put the signals onto a carrier wave of a defined frequency, performs power amplification for the signals, and transmits the signals by way of the transmit antenna T02. The physical downlink shared channel in which the downlink control data is distributed typically comprises Layer 3 messages (RRC messages).

Further, the receiver 201 converts the signals received from the wireless terminal 1 by way of the receive antenna R02 into baseband digital signals. In cases where cells with a plurality of different transmission timings for the wireless terminal 1 have been configured, the receiver 201 receives the signals at the timings that differ cell by cell (or by cell group, or by TA group). The digital signals converted in the receiver 201 are input into the demodulator 202 and demodulated. The signals demodulated in the demodulator 202 are subsequently input into the decoder 203.

The decoder 203 decodes the inputted signals and inputs the decoded data items (uplink data or uplink control data) into the receive-data controller 204. And, together with the data items, the MAC control elements transmitted from the wireless terminal 1 are also decoded in the decoder 203, and the corresponding data is input into the receive-data controller 204.

The receive-data controller 204 carries out control of the physical layer controller 205 (e.g., control relating to power headroom reports, control relating to buffer status reports, etc.) based on the received MAC control elements, and performs buffering of the decoded data items, and error-correction control (HARQ) of retransmitted data. The data items inputted into the receive-data controller 204 are input into (forwarded to) the radio resource controller 210 as necessary.

When a buffer status report from a wireless terminal 1 has been inputted through the decoder 203, the receive-data controller 204 discriminates whether it is a transmission resource request for communicating with the base station itself, or a transmission resource request for inter-device data communication, and establishes the assigned transmission resource in the given wireless terminal 1.

Further, the receive-data controller 204 may measure the reception quality of the uplink reference signals and announce the measurement results to the radio resource controller 210. Based on the announced reception quality, the radio resource controller 210 may determine the repetition number of transmission for the wireless terminal 1 in enhanced coverage.

The physical-layer control information configured to control each of these blocks, is information, constituted by reception control information and transmission control information, containing parameter configurations required for radio-communications control of the base station 2. The physical-layer control information is configured by upper-layer network devices (MMES or gateway devices (SGWs), OAMs, etc.) and system parameters, with the radio resource controller 210 inputting the information into the controller 204 as necessary.

Into each of the encoder 207, modulator 208 and transmitter 209 blocks, the physical layer controller 205 inputs, as transmission control information, the physical layer control information associated with transmission, and into each of the receiver 201, modulator 202 and decoder 203 blocks suitably inputs, as reception control information, the physical layer control information associated with reception.

The reception data control information contains control information relating to the uplink for the wireless terminal 1 with respect to each of the MAC layer, the RLC layer, and the PDCP layer in the base station 2. Likewise, the transmission data control information contains control information relating to the downlink for the wireless terminal 1 with respect to each of the MAC layer, the RLC layer, and the PDCP layer in the base station 2. This means that the reception data control information and the transmission data control information are established on a per wireless terminal 1 basis.

Further, the radio resource controller 210 configures information for the transmission, as well as the reception, repetition number (repetition number of reception, repetition number of transmission), based on measurement report messages from the wireless terminal 1 and/or on uplink reception-quality information from the receive-data controller 204. This means that the radio resource controller 210 configures the repetition number of downlink that a wireless terminal 1 receives, and the repetition number of uplink that a wireless terminal 1 transmits, on a per wireless terminal 1 basis. The repetition number may be configured commonly in the uplink and the downlink, or may be configured independently for the uplink and the downlink separately, or may be configured on a per physical channel basis.

The radio resource controller 210 creates RRC messages containing, as information elements, the repetition number, and outputs them to the receive-data controller 204. The radio resource controller 210 also instructs to the physical layer controller 205, the repetition number of reception and/or the repetition number of transmission configured for a wireless terminal 1. The RRC messages may be, for example, RRC reconfiguration messages, or may be new RRC messages.

The network signal transceiver 211 carries out transmission (forwarding) as well as reception of control messages as well as user data between base stations 2, or between an upper-level network device (MME, SGW) and a base station 2. In FIG. 2, other configurational elements of the base station 2 and inter-configurational-element data (control information) propagation paths are omitted, yet it should be apparent that the base station 2 possesses, as configurational elements, a number of blocks having those other functions necessary in order for it to operate as a base station. For example, in the upper-level of the radio resource controller 210, a radio resource management unit and an application layering unit are present.

The cell selection process (cell selection procedure) by a wireless terminal 1 will be described below.

In the cell selection procedure, the wireless terminal 1 attempts to (detect) find a suitable cell. A "suitable cell" is a cell in which the wireless terminal 1 camps in order to receive normal services, and needs to fulfill all of the following conditions: (1) Being a part of a selected public-land mobile network (PLMN) or a registered PLMN, or a part of a PLMN on an equivalent-PLMN list. (2) In the case of closed-subscriber group (CSG) cells, the cell is a CSG member cell for the wireless terminal 1.

(3) It fulfills each of latest information items provided by the NAS layer (a. that it is not a barred cell, and b. that the cell is not a part of a list of "forbidden tracking area (TA) for roaming", but is a part of at least one TA), and it fulfills (1) noted above. (4) The measurement quality of the cell fulfills criteria for cell-selection evaluation (also referred to as "S criteria").

Further, in cases where, in the cell selection procedure, a wireless terminal 1 cannot find a suitable cell, it attempts to detect an acceptable cell. An "acceptable cell" is a cell (e.g., emergency cell) in which a wireless terminal 1 camps in order to receive restricted services, and needs to fulfill the conditions that i. the cell is not a barred cell, and that ii. the measurement quality of the cell fulfills criteria for the cell-selection evaluation.

The criteria for cell-selection evaluation (S criteria) in order for a wireless terminal 1 to select a cell are indicated in the following.

The wireless terminal 1 measures the downlink reference signal to get the RSRP and the RSRQ as the reception quality of the cell. The base station 2 transmits to the wireless terminal 1, minimum required reception level Q-RxLevMin and minimum required quality level Q-QualMin, configured based on cell radius etc., as a part of system information for a cell in question. The base station 2 also transmits to each cell an offset value $Q_{rxlevminoffset}$ for the minimum required reception level, an offset value $Q_{qualminoffset}$ set for the minimum required quality level, and a maximum-transmission-power level compensation value $P_{compensation}$, as a part of the system information.

The maximum-transmission-power level compensation value uses whichever is the larger of the values between the calculation result from the following formula (1), and zero (0).

$$P_{emax} - P_{powerclass} \qquad (1)$$

Herein, $P_{emax}$ is the maximum transmission power permitted transmission in a cell in question, and is transmitted on a per cell basis as a part of the system information. $P_{powerclass}$ is the maximum value of the transmission power that is transmissible by a wireless terminal 1, and is a parameter unique or substantially unique to the wireless terminal 1.

The wireless terminal 1 uses criteria for cell-selection evaluation the two below-noted equations (2) defined, using the RSRP measurement result $Q_{rxlevmeas}$ and the RSRQ measurement result $Q_{qualmeas}$ for a cell in question, by:

$$S_{rxlev} = Q_{rxlevmeas} - (Q_{rxlevmin} + Q_{rxlevminoffset}) - P_{compensation}$$

$$S_{qual} = Q_{qualmeas} - (Q_{qualmin} + Q_{qualminoffset}) \qquad (2)$$

Specifically, the wireless terminal 1 judges a cell in which $S_{rxlev} > 0$ and $S_{qual} > 0$ to be a cell fulfilling criteria for the cell-selection evaluation.

Here, for each of the above-noted equations a temporary offset value $Q_{offsettemp}$ that is applied in cases where the RRC connection establishment procedure has failed a predetermined number of times may be added for a period of time connEstFailOffsetValidity during which the offset value is made valid. The wireless terminal 1 may use these parameters in cases where the temporary offset value $Q_{offsettemp}$ and its validity period connEstFailOffsetValidity have been notified from the base station 2 in the system information for a cell in question. The criteria for cell-selection evaluation in that case are calculated by the below-noted equations (3) defined respectively by:

$$S_{rxlev} = Q_{rxlevmeas} - (Q_{rxlevmin} + Q_{rxlevminoffset}) - P_{compensation} - Q_{offsettemp}$$

$$S_{qual} = Q_{qualmeas} - (Q_{qualmin} + Q_{qualminoffset}) - Q_{offsettemp} \quad (3)$$

These parameters that a wireless terminal 1 uses as criteria for cell-selection evaluation may be included in system information (e.g., System Information Block Type1, SIB1) that is provided for the cell selection procedure in all wireless terminals 1 (that is, first through third types of wireless terminals), or may be included in new system information (e.g., System Information Block Type20, SIB20) that is provided for the cell selection procedure in a wireless terminal 1 that supports coverage enhancement (that is, second and third types of wireless terminals), or may be included in either system information. The system information that is provided for the cell selection procedure in all wireless terminals 1 will be referred to as first system information, while the new system information that is provided for the cell selection procedure in a wireless terminal 1 that supports coverage enhancement will be referred to as second system information.

In cases where new system information (e.g., an SIB20) is used, such system information may be afforded at least one of the features indicated below.
(1) Being transmitted on a bandwidth of six contiguous RBs or fewer (narrowband);
(2) Being transmitted bundled (repeated) from the base station 2;
(3) Not requiring a PDCCH or an EPDCCH (not being scheduled in a PDCCH or and EPDCCH);
(4) Being scheduled in a PDCCH or an EPDCCH distributed in a different domain (search space);
(5) Being scheduled in a narrowband PDCCH or EPDCCH;
(6) Designating a modulation and encoding scheme based on other system information (e.g. MIB/SIB1) or system parameters;
(7) Having a system information modification period that is longer-term than is conventional;
(8) Being applicable only in second and third types of wireless terminals; and
(9) Being considered as essential system information in second and third types of wireless terminals.

According to the present embodiment, a wireless terminal 1 that does not support coverage enhancement may use parameters (first cell-selection parameters) contained in first system information, while a wireless terminal 1 that supports coverage enhancement may perform cell selection using new parameters (second cell-selection parameters), contained in second system information, associated with coverage enhancement.

For that situation, a set of a plurality of parameters in accordance with the repetition number may be configured in second system information, or only a part of the parameters may be configured in the system information. That is, a cell that supports 1 to 3 repetitions as a repetition number would possess a set of three types of parameters. And rather than a value in accordance with the repetition number, all or a part of parameters corresponding to the maximum repetition number that the base station 2 supports (or that it reports) may be configured in the system information.

When parameters are configured according to repetition number, based on the measurement result (RSRP, RSRQ) in the cell, the wireless terminal 1 may select the parameter (or a parameter set) to be applied. That is, the wireless terminal 1 may determine the repetition level based on the measurement result of the cell, and apply the parameter (or parameter set) that corresponds to the repetition level.

Also, when parameters are configured according to repetition number, the wireless terminal 1 may select the to-be-applied parameter (or parameter set) based on the wireless terminal's capability (UE capability). What is herein considered to be the "user-equipment capability" of a wireless terminal 1 includes, for example, physical-layer capability information such as the maximum repetition number that the wireless terminal 1 supports, capability information relating to the wireless terminal 1 type, from first to third, and other capability information indicating whether the wireless terminal 1 supports mobility (i.e., procedures associated with changing cells, such as cell reselection or handover)—or whether the terminal is portable.

The conditions required for measurement of a wireless terminal 1 that supports coverage enhancement may be relaxed over the conditions required for measurement of an ordinary wireless terminal 1 (also referred to as a "normal coverage UE").

Furthermore, a plurality of system information items (second system information) in accordance with repetition number may be transmitted. Specifically, the base station 2 may transmit system information (referred to as "System Information A") that supports a first number of repetition (that is transmitted with a first number of repetition), and system information (referred to as "System Information B") that supports a second number of repetition (that is transmitted with a second number of repetition). System Information A and System Information B contain parameters relating to later-described cell selection. In sum, second system information contains System Information A and System Information B.

Also, system information that supports coverage enhancement means system information that, whereas the periodicity of ordinary (conventional) system information (SI-periodicity, first periodicity) is from 8 radio frames to 512 radio frames, is transmitted iteratively at least at a periodicity that is (e.g., in subframe units that are) shorter than that. In other words, system information that supports coverage enhancement is system information that, following certain rules (regulations, configurations) is repeatedly transmitted from the base station 2 at the periodicity of new system information (second periodicity), and is system information acquirable by repeatedly receiving at a wireless terminal 1 that supports coverage enhancement.

Herein, the second number of repetition is a value larger than the first number of repetition. For example, the first number of repetition=30 times, and the second number of repetition=150 times. Also, the repetition level (bundling size) of the second number of repetition is a greater repetition level (bundling size) than the repetition level (bundling size) of the first number of repetition. For example, the repetition level (bundling size) of the first number of repetition=1, and the repetition level (bundling size) of the second number of repetition=2. Not being thereby limited, furthermore, system information that corresponds to third . . . n$^{th}$ (n>3) number of repetition also may be transmitted.

System information corresponding to repetition number (e.g., System Information A and System Information B) may be transmitted in system information blocks (SIBs) that each differ, or may be made up of a plurality of system information blocks (SIBs).

Figure 3:
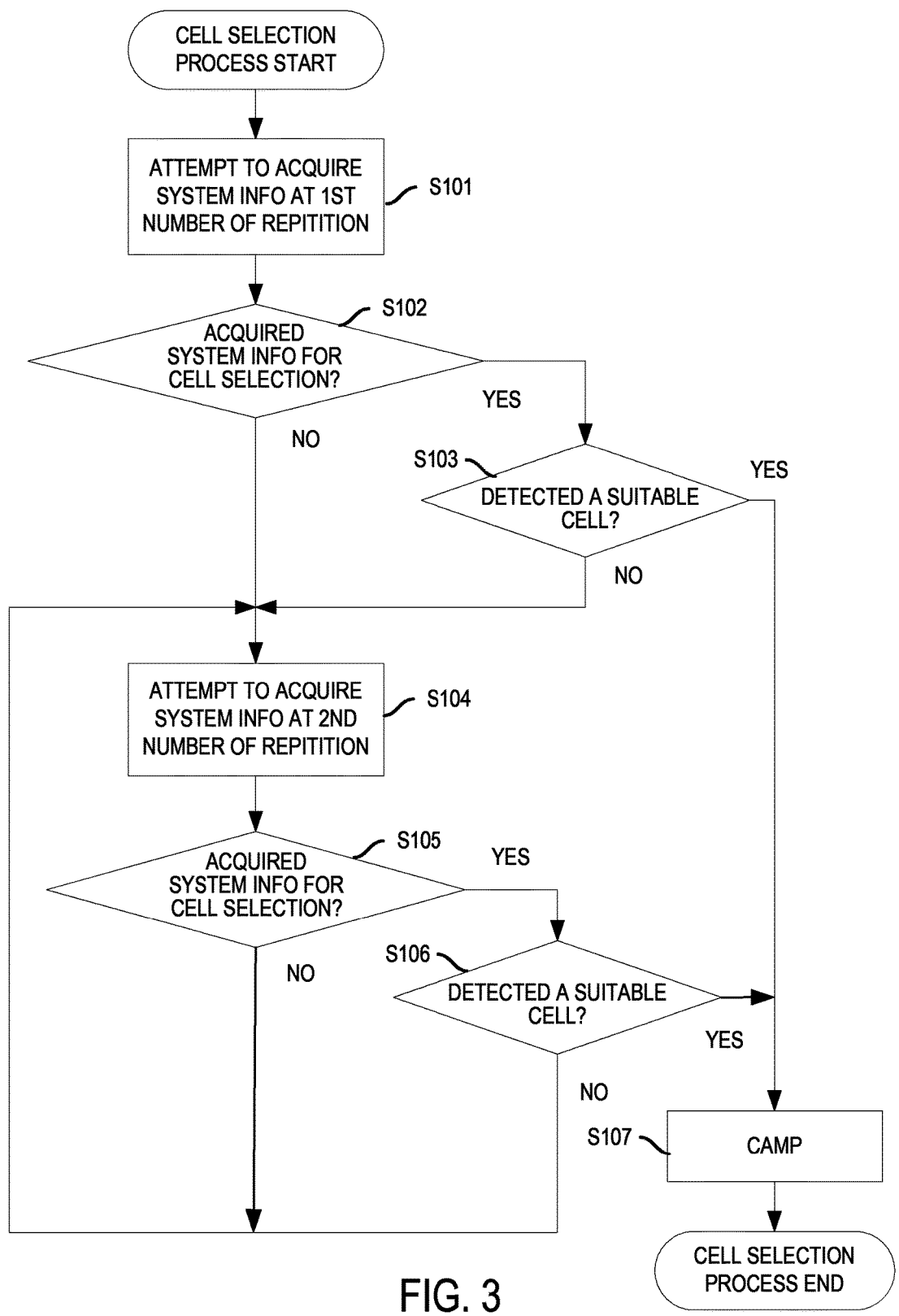
FIG. 3 is a diagram illustrating one example, involving a first embodiment of the present disclosure, of a procedure relating to cell selection in a wireless terminal for a case where a number of system information items are transmitted.

FIG. 3 is a diagram illustrating one example of a procedure relating to cell selection in a wireless terminal 1 that supports coverage enhancement, for a case where system information corresponding to a repetition number is transmitted.

With regard to system information corresponding to a first number of repetition (System Information A), the base station 2 performs repetition (bundling) transmission for the first number of repetition (e.g. 30 times). Alternatively, with regard to a TB (which also can be said to be a MAC PDU) that contains System Information A (which also can be said to be a BCCH, BCH, or SIB that corresponds to System Information A), the base station 2 performs repetition transmission for the first number of repetition. Further, with regard to system information corresponding to a second number of repetition (System Information B), the base station 2 performs repetition (bundling) transmission for the second number of repetition (e.g. 150 times). Alternatively, with regard to a TB (which also can be said to be a MAC PDU) that contains System Information B (which also can be said to be a BCCH, BCH, or SIB that corresponds to System Information B), the base station 2 performs repetition transmission for the second number of repetition.

A wireless terminal 1 to begin with attempts to receive (acquire) system information corresponding to a first number of repetition. Specifically, with regard to System Information A (which also can be said to be a BCCH, BCH, or SIB that corresponds to System Information A), the wireless terminal 1 attempts to acquire System Information A (a TB (which also can be said to be a MAC PDU) that contains System Information A) by repeating a reception process the number of times indicated in the first number of repetition (Step S101). If the wireless terminal 1 has been able to correctly acquire System Information A ("yes" in Step S102), it performs cell evaluation using the parameters (cell selection parameters, cell selection information) contained in the System Information A (Step S103).

In cases where a cell in which System Information A can be acquired has not been detected ("no" in Step S102), the wireless terminal 1 attempts to receive (acquire) system information corresponding to a second repetition count. Specifically, with regard to System Information B (which also can be said to be a BCCH, BCH, or SIB that corresponds to System Information B), the wireless terminal 1 attempts to acquire System Information B (a TB (which also can be said to be a MAC PDU) that contains System Information B) by repeating a reception process the number of times indicated in the second repetition count (Step S104). If the wireless terminal 1 has been able to correctly acquire System Information B ("yes" in Step S105), it performs cell evaluation using the parameters (cell selection parameters) contained in the System Information B (Step S106).

In cases where a cell in which System Information B can be acquired has not been detected ("no" in Step 105), the wireless terminal 1 returns to Step S104 and once again attempts to receive (acquire) system information corresponding to a second number of repetition. In Step S103 and Step S106, the wireless terminal 1 performs cell evaluation using (applying) the acquired system information as criteria for cell-selection evaluation (later-described). In Step S103 and Step S106, if the wireless terminal 1 has detected (found) a suitable cell fulfilling criteria for the cell-selection evaluation ("yes" in Step S103, or "yes" in Step S106), it camps on the cell in question (Step S107) and ends the cell selection process.

On the other hand, in Step S103 and Step S106, if the wireless terminal 1 has not detected a cell fulfilling the criteria for cell-selection evaluation ("no" in Step S103, or "no" in Step S106), it attempts to receive (acquire) system information corresponding to a second number of repetition (Step S104). It should be understood that instances of the case where none of the evaluated cells have fulfilled criteria for the cell-selection evaluation, all of the evaluated cells are barred cells, or cell-selectable cells (suitable cells) could not be found.

It should also be understood that System Information B may be the same as System Information A. That is, in Step S104, the wireless terminal 1 may attempt to acquire System Information A using a second number of repetition. In that case, both cell selection parameters corresponding to a first number of repetition and cell selection parameters corresponding to a second number of repetition are included in System Information A.

It should be noted that depending on the corresponding repetition number for a system, the processes in Step S101 through Step S103 may be repeated. Moreover, the first number of repetition may be zero (a repetition level may be zero). That is, the operations may be the same as those of an ordinary wireless terminal 1 that does not perform repetition reception.

The base station 2 may use information contained in an MIB/SIB1, or a new scheduling block to notify a wireless terminal 1 as to whether a cell is one in which system information (System Information A, System Information B, etc.) that supports coverage enhancement is being transmitted, whether a cell is one in which system information that supports coverage enhancement has been scheduled, or whether a cell is one in which system information that supports coverage enhancement is present.

In addition, the base station 2 may use information contained in an MIB/SIB1, or a new scheduling block to notify whether a cell is one in which a system information block (an SIB20, etc.) that supports coverage enhancement has been scheduled, or whether a cell is one in which a system information block that supports coverage enhancement is present. That is, these methods enable the base station 2 to notify a wireless terminal 1 as to whether a cell is a coverage enhancement cell. Also, the base station 2 in transmitting may include information indicating whether System Information B is present (has been scheduled) in System Information A.

The wireless terminal 1 may use information contained in an MIB/SIB1, or a new scheduling block to judge whether a cell is one in which system information (System Information A, System Information B, etc.) that supports coverage enhancement is being transmitted, whether a cell is one in which system information that supports coverage enhancement has been scheduled, or whether a cell is one in which system information that supports coverage enhancement is present.

In addition, the wireless terminal 1 may use information contained in an MIB/SIB1, or a new scheduling block to judge whether a cell is one in which a system information block (an SIB20, etc.) that supports coverage enhancement has been scheduled, or whether a cell is one in which a system information block that supports coverage enhancement is present. That is, these methods enable the wireless terminal 1 to judge whether a cell is a coverage enhancement cell.

Parameters used for criteria for cell-selection evaluation in cell selection (cell selection parameters)—that is, parameters contained in the system information relating to cell selection—will be described.

As parameters used for criteria for cell-selection evaluation in cell selection, (1) a minimum required reception level $Q_{rxlevmin\_ce}$ that a wireless terminal 1 supporting coverage enhancement uses, and (2) a minimum required quality level $Q_{qualmin\_ce}$ that a wireless terminal 1 supporting coverage enhancement uses may respectively be notified.

Hereinafter, a conventional minimum required reception level $Q_{rxlevmin}$ will be referred to as first minimum required reception level, with a minimum required reception level $Q_{rxlevmin\_ce}$ that a wireless terminal 1 supporting coverage enhancement uses being referred to as second minimum required reception level, and a conventional minimum required quality level $Q_{qualmin}$ will be referred to as first minimum required quality level, with a minimum required quality level $Q_{qualmin\_ce}$ that a wireless terminal 1 supporting coverage enhancement uses being referred to as second minimum required quality level.

A wireless terminal 1 supporting coverage enhancement performs cell selection using second minimum required reception level and second minimum required quality level for criteria for cell-selection evaluation. Specifically, the wireless terminal 1 supporting coverage enhancement uses for criteria for cell selection evaluation the below-noted two equations (4), defined by:

$$S_{rxlev}=Q_{rxlevmeas}-(Q_{rxlevmin\_ce}+Q_{rxlevminoffset})-P_{compensation}$$

$$S_{qual}=Q_{qualmeas}-(Q_{qualmin\_ce}+Q_{qualminoffset}) \quad (4)$$

Herein, each of the second minimum required reception level $Q_{rxlevmin\_ce}$ and the offset value $Q_{rxlevminoffset}$ set are doubled and applied to the above equation. That is, in an instance in which $Q_{rxlevmin\_ce}$ is notified by the value "n", the calculation "2×n" is performed and then applied to the above equation. It will be appreciated that in cases where the RRC connection establishment procedure has failed a predetermined number of times, wireless terminal 1 can apply a temporary offset value $Q_{offsettemp}$ to the criteria for cell-selection evaluation for a period of time connEstFailOffsetValidity during which the offset value is made valid. The wireless terminal 1 may use these parameters in cases where the temporary offset value $Q_{offsettemp}$ and its validity period connEstFailOffsetValidity have been notified from the base station 2 in the system information for a cell in question.

The second minimum required reception level and the second minimum required quality level may be notified not as differing parameters (information elements), but as the same parameters assuming values in differing ranges. For example, the base station 2 may notify to a conventional wireless terminal 1 a single value included in the range from "−70" to "−22" as the minimum required reception level, and may notify to a wireless terminal 1 supporting coverage enhancement a single value included in the range from "−85" to "−71" as the minimum required reception level. In that case, the value notified to the wireless terminal 1 supporting coverage enhancement is designed so as to be less than the value notified to the conventional wireless terminal 1.

Further, the second minimum required reception level and the second minimum required quality level may be found by calculating from the first minimum required reception level and the first minimum required quality level. Here, letting a value used in the calculation be a given value x (value_x), then the second minimum required reception level and the second minimum required quality level are each determined by the below-noted two equations (5), defined by:

$$Q_{rxlevmin\_ce}=Q_{rxlevmin}+\text{value\_}x$$

$$Q_{qualmin\_ce}=Q_{qualmin}+\text{value\_}x \quad (5)$$

It will be appreciated that the value for finding the second minimum required quality level may be reported as a given value y (value_y) distinct from the given value x. A given value x (value_x), as well as a given value x (value_x) and a given value y (value_y), may be notified by first or second system information, may be notified by an individual RRC message, or may be a value(s) uniquely decided within the system as a system parameter(s).

In the cell selection procedure, a wireless terminal 1 supporting coverage enhancement may apply the second minimum required reception level and second minimum required quality level to criteria for cell-selection evaluation only for cells that support coverage enhancement, or may apply the second minimum required reception level and the second minimum required quality level to criteria for cell-selection evaluation for all the cells. And in the cell selection procedure, a wireless terminal 1 supporting coverage enhancement may apply the first minimum required reception level and the first minimum required quality level to criteria for cell-selection evaluation for cells in a case where it is unclear whether the cells support coverage enhancement.

And a conventional wireless terminal 1 (a first type of wireless terminal), regardless of whether or not a cell is one that supports coverage enhancement, or regardless of whether information relating to the second minimum required reception level and the second minimum required quality level has been notified (transmitted), may apply the first minimum required reception level and the first minimum required quality level to criteria for cell-selection evaluation.

Based on information elements such as identifiers contained in system information (e.g., an SIB1), or on a cell ID, the base station 2 may indicate to a wireless terminal 1 whether or not a cell supports coverage enhancement. In addition, the base station 2, by including information indicating second minimum required reception level and/or information indicating second minimum required quality level, selection parameters relating to coverage enhancement, or any or all of information elements that relate to coverage enhancement into system information (e.g., an SIB20) and transmitting such information, may implicitly indicate that a cell supports coverage enhancement.

The wireless terminal 1 may consider (e.g. deem, decide or determine) cells for which not any information elements relating to coverage enhancement are contained in the system information as cells (ordinary cells) that do not support coverage enhancement.

Figure 4:
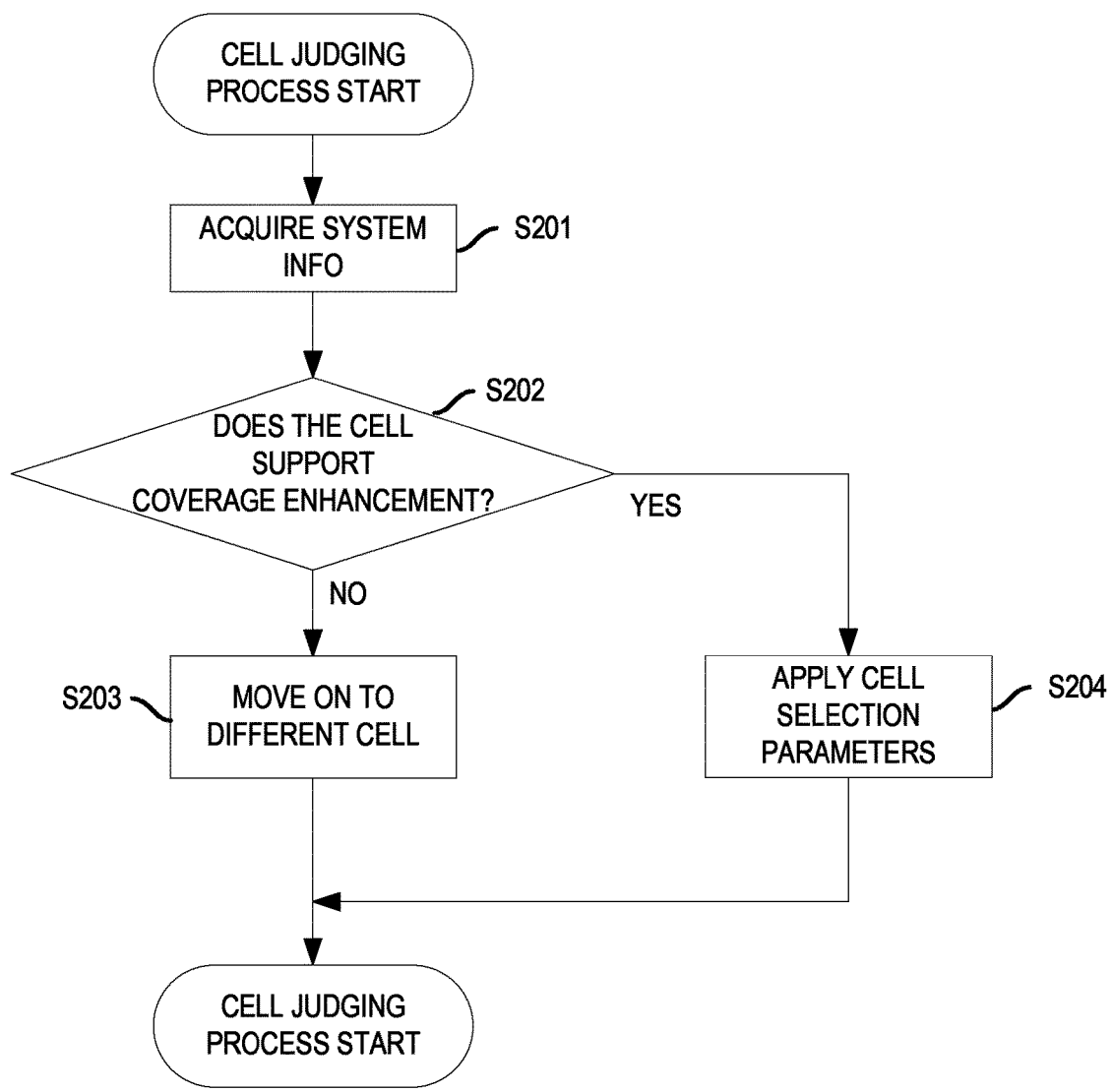
FIG. 4 is a flowchart illustrating one example, involving the first embodiment of the present disclosure, of a procedure for cases where a wireless terminal judges whether a cell handles coverage enhancement.

FIG. 4 is a flowchart illustrating one example of a procedure for cases where a wireless terminal 1 judges whether a cell handles coverage enhancement (is a coverage enhancement cell). The FIG. 4 procedure may be executed in Step S103 or Step S106 of FIG. 3.

A wireless terminal 1 supporting coverage enhancement acquires system information for a cell at a given repetition number (Step S201). Then based on the acquired system information the terminal judges whether or not the cell in question is a cell supporting coverage enhancement (Step S202).

In Step S202, based on information elements such as identifiers contained in the system information, or on a cell ID, the wireless terminal 1 may judge whether a cell supports coverage enhancement. And a cell where information indicating second minimum required reception level and/or second minimum required quality level, other cell-selection parameters relating to coverage enhancement, or system information containing any information elements relating to coverage enhancement is transmitted may be judged to be a cell that supports coverage enhancement.

In Step S202, if a cell in question has been judged to be a cell that supports coverage enhancement ("yes" in Step S202), the wireless terminal 1 supporting coverage enhancement performs a cell selection process based on parameters (cell selection parameters) in the acquired system information (Step S204).

On the other hand, in Step S202, if the cell in question has been judged not to be a cell that supports coverage enhancement ("no" in Step S202), the wireless terminal 1 supporting coverage enhancement considers (e.g. deem, decide or determine) the cell in question as a barred cell, and is not permitted to select that cell. If the wireless terminal 1 has the functionality of a conventional wireless terminal 1 (first type of wireless terminal) and also handles coverage enhancement, however, then based on access restriction information notified by the system information (cell-status and cell-reservation information) and on access information for the wireless terminal itself, the wireless terminal 1 may judge whether a cell in question is a barred cell.

Also, a conventional wireless terminal 1 (first type of wireless terminal), based on access restriction information notified by the system information (cell-status and cell-reservation information) and on access information for the wireless terminal itself, judges whether a cell in question is a barred cell.

When a cell has turned out not to support coverage enhancement, if there are other candidate cells, then the determination as to whether the cells are coverage enhancement cells is once again performed (Step S203). The procedure for different cells may be by the same processes, and therefore a description thereof will be omitted.

As parameters used for criteria for cell-selection evaluation in cell selection, for example, (1) a reception-level offset $Q_{rxlevoffset\_ce}$ used by a wireless terminal 1 supporting coverage enhancement, and (2) a quality-level offset $Q_{qualoffset\_ce}$ used by a wireless terminal 1 supporting coverage enhancement may be respectively notified.

A wireless terminal 1 supporting coverage enhancement uses the reception-level offset and the quality-level offset for criteria for cell-selection evaluation to perform cell selection. Specifically, the wireless terminal 1 supporting coverage enhancement uses for criteria for cell selection evaluation the below-noted two equations (6), defined by:

$$S_{rxlev}=Q_{rxlevmeas}-(Q_{rxlevmin}+Q_{rxlevminoffset})-P_{compensation}-Q_{rxlevoffset\_ce}$$

$$S_{qual}=Q_{qualmeas}-(Q_{qualmin}+Q_{qualminoffset})-Q_{qualoffset\_ce} \quad (6)$$

Herein, the reception level offset $Q_{rxlevoffset\_cc}$ is doubled and then applied to the above equation. That is, in an instance in which $Q_{rxlevoffset\_cc}$ is notified by the value "m," the calculation "2×m" is performed and then applied to the above equation. It will be appreciated that in cases where the RRC connection establishment procedure has failed a predetermined number of times, it is possible for the wireless terminal 1 to apply a temporary offset value $Q_{offsettemp}$, and a validity period connEstFailOffsetValidity for the offset value, to the respective criteria for cell-selection evaluation (Equation (6)).

As criteria for cell-selection evaluation in cell selection, the wireless terminal 1 supporting coverage enhancement may apply the reception-level offset and the quality-level offset only to cells that support coverage enhancement, or may apply the reception-level offset and the quality-level offset to all of the evaluated cells. And in the cell selection procedure the wireless terminal 1 supporting coverage enhancement may apply the reception-level offset and the quality-level offset to criteria cell-selection evaluation for cells for which it is unclear whether the cells support coverage enhancement (or else applying the offsets as zero to the cells).

Further, in the cell selection procedure, a wireless terminal 1 supporting coverage enhancement may consider either the reception-level offset or the quality-level offset, or else the value of both offsets to be infinity in respect of cells in which a reception-level offset and quality-level offset are not notified by the system information and/or cells for which whether the cell supports coverage enhancement is unclear. In that situation, the cell in question will necessarily be $S_{rxlev}<0$ and $S_{qual}<0$, not fulfilling the criteria for cell-selection evaluation in the wireless terminal 1.

And a conventional wireless terminal 1 (first type of wireless terminal), regardless of whether or not a cell is one that supports coverage enhancement, or regardless of whether information relating to the reception-level offset and the quality-level offset has been notified (transmitted), need not apply the reception-level offset and the quality-level offset to the criteria for cell-selection evaluation (or else applying the offsets as zero to the cells).

The reception-level offset and the quality-level offset may be notified by first or second system information, may be notified by an individual RRC message, or may be values uniquely decided within the system as system parameters.

The base station 2 may rely on a cell ID or on information elements such as identifiers contained in the system information to indicate to a wireless terminal 1 whether a cell supports coverage enhancement. In addition, the base station 2 may implicitly indicate to a wireless terminal 1 that a cell is one which supports coverage enhancement by including information indicating a reception-level offset and/or information indicating a quality-level offset, other cell-selection parameters relating to coverage enhancement, or any information elements relating to coverage enhancement, in system information and transmitting such information. And by transmitting information (SchedulingInfo) indicating that system information containing any information elements relating to coverage enhancement has been scheduled, the base station 2 may indicate to a wireless terminal 1 that a cell is one that supports coverage enhancement.

The wireless terminal 1 may consider (e.g. deem, decide or determine) cells for which not any information elements relating to coverage enhancement are contained in the system information, or cells in which system information (e.g., an SIB20) that provides information elements relating to coverage enhancement is not transmitted as cells (ordinary cells) that do not support coverage enhancement. Furthermore, the wireless terminal 1 may consider a cell, which supports coverage enhancement, and not transmitting system information (e.g., an SIB20) that provides information elements relating to coverage enhancement as a barred cell.

The wireless terminal 1 rely on a cell ID or on information elements such as identifiers contained in the system information to judge whether a cell supports coverage enhancement. In addition, it may judge a cell in which system information containing information indicating a reception-level offset and/or a quality-level offset, other cell-selection parameters relating to coverage enhancement, or any information elements relating to coverage enhancement is transmitted to be a cell that supports coverage enhancement. And the wireless terminal 1 may judge a cell in which information (SchedulingInfo) indicating that system information containing any information elements relating to coverage enhancement has been scheduled is transmitted to be a cell that supports coverage enhancement.

Configuring the embodiment in this way enables a wireless terminal 1, in cases where the wireless terminal 1 supports coverage enhancement, to perform cell selection using criteria for cell-selection evaluation corresponding to coverage enhancement by using system information for a base station 2 (cell) that supports coverage enhancement. And by transmitting system information indicating that coverage enhancement is supported, the base station 2 can cause a wireless terminal 1 that supports coverage enhancement to perform cell selection using criteria for cell-selection evaluation corresponding to coverage enhancement.

Furthermore, because the wireless terminal 1 can perform cell selection using suitable criteria for cell-selection evaluation by judging based on information elements contained in system information for the base station 2 whether coverage enhancement is supported, the selecting of cells that do not support coverage enhancement is restricted, enabling efficient cell selection to be performed. And by including whether a cell supports coverage enhancement in system information for the base station 2, and transmitting such information, the base station 2 is able efficiently to perform, with respect to a wireless terminal 1, cell selection in which suitable criteria for cell-selection evaluation is used.

Second Embodiment

In the following, a second embodiment of the present disclosure will be described.

With the first embodiment, an example of a cell selection method in a wireless terminal 1 that supports coverage enhancement was illustrated. With the present embodiment, an example of a cell reselection method in a wireless terminal 1 that supports coverage enhancement will be described.

Cell reselection (a cell reselection procedure) starts after cell selection. The wireless terminal 1 regularly searches for a serving cell and neighboring cells in accordance with criteria for cell reselection evaluation (sometimes also referred to as cell reselection criteria R), and in cases where a cell that is more suitable than the serving cell is found, the suitable cell is camped on.

The wireless terminal 1 and the base station 2 used in this embodiment can employ control methods similar to those employed in the first embodiment except that some operations differ (operations are added). Thus, only what is different from the first embodiment will be described, and apart from that, description of controls that are in common part will be omitted.

Cell reselection performed by the wireless terminal 1 that supports coverage enhancement will be described. The wireless terminal 1 does not need to have part or all of the functionality of cell reselection. For example, the wireless terminal 1 may have only functionality for cell reselection within the same frequency without having functionality for cell reselection for different frequencies.

In the cell reselection, the wireless terminal 1 ranks cells fulfilling Equations (2), (4), or (6) based on Equations (7) as follows.

$$R_s = Q_{meas,s} + Q_{hyst} - Q_{offsettemp}$$

$$R_n = Q_{meas,n} - Q_{offset} - Q_{offsettemp} \quad (7)$$

In Equations (7), $Q_{meas,s}$ is a measurement result of an RSRP of a serving cell, $Q_{meas,n}$ is a measurement result of an RSRP of each neighboring cell. In addition, $Q_{hyst}$ is a hysteresis value (an offset value) of the RSRP of the serving cell, and $Q_{offsettemp}$ is an offset value of the RSRP of each neighboring cell. The wireless terminal 1 performs a ranking of cells based on the results on $R_s$ and $R_n$ and determines one suitable cell (best cell). Further, Qoffsettemp is a temporary offset value that is applied only in a period (connEstFailOffsetValidity) in which the offset value is considered to be effective in cases where RRC connection establishment fails a predetermined number of times. The wireless terminal 1 may consider that $Q_{offsettemp}$ is 0 (zero) in cases where information elements that relate to the temporary offset value are not notified by system information from the base station 2.

The wireless terminal 1 performs cell reselection in cases where more than one second has elapsed since the wireless terminal 1 camped on the current serving cell and the best cell (candidate cell for cell reselection) is better ranked than the serving cell during a time interval indicated by Treselection_EUTRA.

As described above, the candidate cell for cell reselection needs to fulfill criteria for the cell selection evaluation. That is, cells fulfilling $S_{rxlev} > 0$ and $S_{qual} > 0$ are candidates for cell reselection.

Parameters (cell reselection parameters or cell reselection information) used in the criteria for cell reselection evaluation may be included in system information (e.g., system information block type 3 (SIB3) or system information block type 5 (SIB5)) provided for the cell reselection procedure of all the wireless terminals 1 (that is, first through third type of wireless terminals), new system information (e.g., system information block type 21 (SIB21)) provided for a cell reselection procedure of wireless terminals 1 that handle (support) coverage enhancement (that is, the second and third type of wireless terminals), or both of these pieces of system information.

The system information provided for the cell reselection procedure of all the wireless terminals 1 will be referred to as third system information, and the new system information provided for the cell reselection procedure of the wireless terminals 1 that handle coverage enhancement will be referred to as fourth system information.

For example, to perform cell reselection, the wireless terminal 1 that does not handle coverage enhancement may use parameters included in the third system information whereas the wireless terminal 1 that handles coverage enhancement may use new parameters included in the fourth system information.

In a manner similar to that in the first embodiment, a set of parameters in accordance with the repetition number may be configured in the fourth system information, or only some parameters may be configured in the system information. A plurality of pieces of system information (fourth system information) in the number according to the repetition number may be transmitted. Specifically, the base station 2 may transmit, as system information corresponding to coverage enhancement, the fourth system information constituted by system information A and system information B including parameters that relate to cell reselection, which will be described later. It should be noted that the wireless terminal 1 applies cell reselection parameters corresponding to the same repetition number to the measurement results of each cells in order to perform suitable ranking. This method will be described below.

Figure 5:
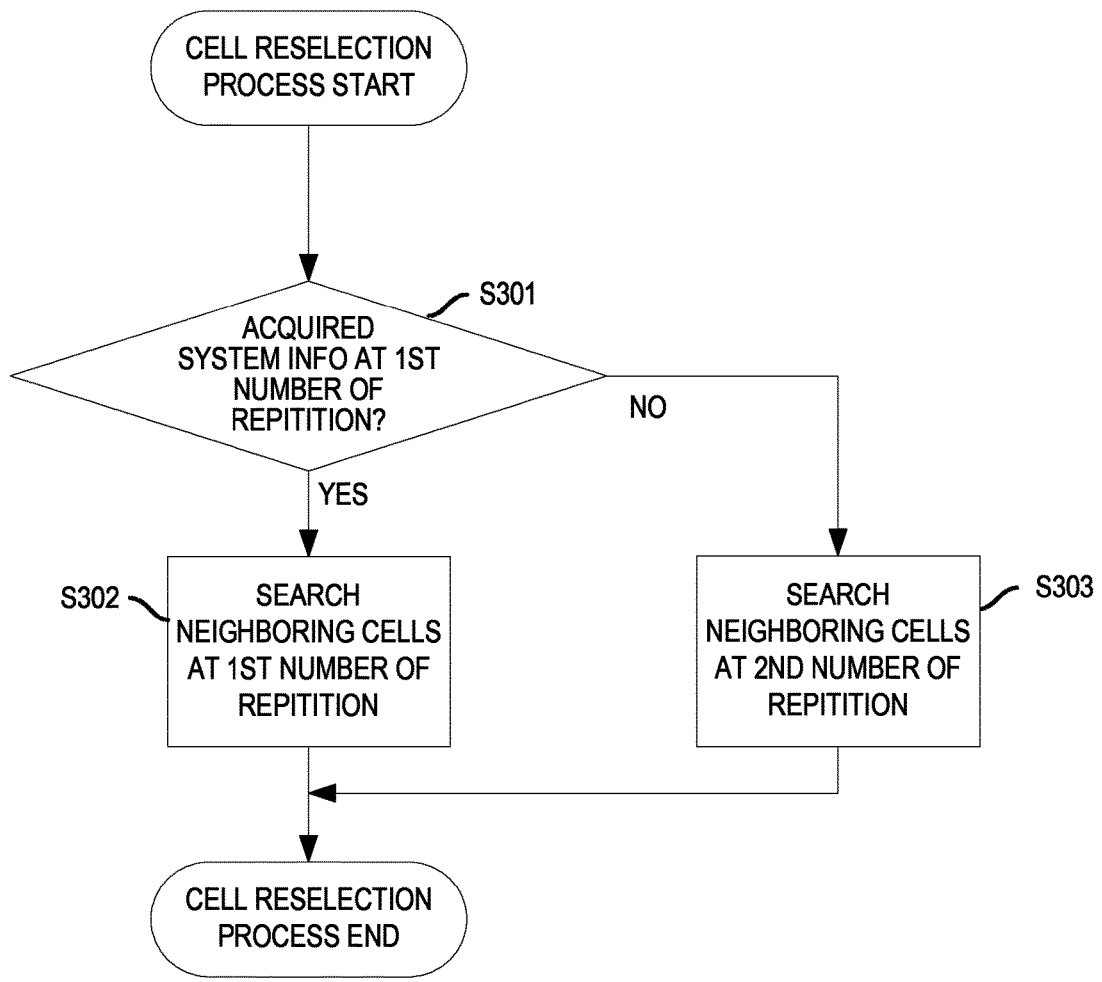
FIG. 5 is a flowchart indicating one example, involving a second embodiment of the present disclosure, of a procedure relating to cell reselection in a wireless terminal for cases where a number of system information items are transmitted.

FIG. 5 is a flowchart indicating an example of a procedure, relating to cell reselection in a wireless terminal 1 that handles coverage enhancement, in cases where system information corresponding to repetition number is transmitted.

The wireless terminal 1 determines repetition number to which system information applied, to the corresponding serving cell that is camped on (Step S301). Specifically, in a case where cell selection is performed by applying parameters (cell-selection parameters) included in system information (system information A) corresponding to a first number of repetition (that is, transmission is repeated with the first number of repetition) (Yes at Step S301), the parameters (cell-reselection parameters) included in the system information (system information A) corresponding to the first number of repetition are applied in the cell reselection so that a cell reselection procedure is performed. In this case, the wireless terminal 1 repeatedly searches candidate cells (neighboring cells) for cell reselection for the first number of repetition (Step S302).

In a case where cell selection is performed by not applying the parameters (cell-selection parameters) included in the system information (system information A) corresponding to the first number of repetition ("no" at Step S301), that is, cell selection is performed by applying parameters (cell-selection parameters) included in the system information (system information B) corresponding to a second number of repetition (that is, transmission is repeated with the second number of repetition), the parameters (cell-reselection parameters) included in the system information (system information B) corresponding to the second number of repetition are applied in the cell reselection so that a cell reselection procedure is performed. In this case, the wireless terminal 1 repeatedly searches candidate cells (neighboring cells) for cell reselection for the second number of repetition (Step S303).

The wireless terminal 1 may also use parameters provided from system information that is different between intra-frequency measurement and inter-frequency measurement. For example, with regard to a second minimum required reception level $Q_{rxlevmin\_ce}$ used by the wireless terminal 1 that handles coverage enhancement and a second minimum required quality level $Q_{qualmin\_ce}$ used by the wireless terminal 1 that handles coverage enhancement, the wireless terminal 1 may use information included in first system information (e.g., SIB1) or second system information (e.g., SIB20) in cell selection, may use information included in third system information (e.g., SIB3) or fourth system information (e.g., SIB21) for the same frequency in intra-frequency cell reselection, and may use information included in third system information (e.g., SIB5) or fourth system information (e.g., SIB21) for different frequencies in inter-frequency cell reselection.

In the cell reselection procedure, the wireless terminal 1 supporting coverage enhancement may apply the second minimum required reception level and the second minimum required quality level, to criteria for cell selection evaluation, only for cells that support coverage enhancement, or may apply the second minimum required reception level and the second minimum required quality level to all of the cells.

In the cell reselection procedure, the wireless terminal 1 supporting coverage enhancement may apply the first minimum required reception level and the first minimum required quality level, to criteria for cell selection evaluation for cells in a case where it is unclear whether the cells support coverage enhancement.

In the conventional wireless terminal 1 (first type of wireless terminal) may apply the first minimum required reception level and the first minimum required quality level, to criteria for cell selection evaluation for the cells, irrespective of whether these cells support coverage enhancement or whether information that relates to the second minimum required reception level and the second minimum required quality level is notified (transmitted).

The base station 2 may indicate whether a cell is a neighboring cell that supports coverage enhancement to the wireless terminal 1 for each neighboring cell based on neighboring cell list information (neighboring cell list) included in system information (e.g., SIB4, SIB5, or SIB21). For example, the base station 2 may indicate whether a cell is a neighboring cell that supports coverage enhancement to the wireless terminal 1 based on information elements such as identifiers or cell IDs for each neighboring cell listed in the neighboring cell list information. The base station 2 may implicitly indicate that the cell is a cell (neighboring cell) supporting coverage enhancement to the wireless terminal 1 by transmitting neighboring cell list information included in system information (e.g., SIB4, SIB5, or SIB21) and including information of one or all of information elements including information indicating the second minimum required reception level, information indicating the second minimum required quality level, cell-reselection parameters that relate to coverage enhancement, and other parameters that relate to coverage enhancement.

The wireless terminal 1 may determine whether a cell is a neighboring cell that supports coverage enhancement based on information elements such as identifiers included in system information (including neighboring cell list information) or cell IDs. The wireless terminal 1 may also determine, as a cell (neighboring cell) that supports coverage enhancement, a neighboring cell to which transmission of system information including information elements such as information indicating the second minimum required reception level, information indicating the second minimum required quality level, other cell-reselection parameters that relate to coverage enhancement, and other information elements that relate to coverage enhancement is indicated.

The wireless terminal 1 may acquire system information including an information element of one of information indicating the second minimum required reception level, information indicating the second minimum required quality level, other cell-reselection parameters that relate to coverage enhancement, or other information elements that relate to coverage enhancement, directly from neighboring cells.

The wireless terminal 1 that handles coverage enhancement, for example, may use a reception-level offset $Q_{rxlevoffset\_ce}$ and a quality-level offset $Q_{qualoffset\_ce}$ for criteria for cell selection evaluation in cell reselection.

With regard to the reception-level offset $Q_{rxlevoffset\_ce}$ used by the wireless terminal 1 that handles coverage enhancement and the quality-level offset $Q_{qualoffset\_ce}$ used by the wireless terminal 1 that handles coverage enhancement, the wireless terminal 1 may use information included in the first system information (e.g., SIB1) or the second system information (e.g., SIB20) in cell selection, may use neighboring cell list information for the same frequency included in the third system information (e.g., SIB4) or the fourth system information (e.g., SIB21) in intra-frequency cell reselection, and may use neighboring cell list information for different frequencies included in the third system information (e.g., SIB5) or the fourth system information (e.g., SIB21) in inter-frequency cell reselection.

The wireless terminal 1 that handles coverage enhancement may apply the reception-level offset and the quality-level offset to criteria for cell selection evaluation in cell reselection only for a cell that supports coverage enhancement or may apply the reception-level offset and the quality-level offset to all of the detected cells. In the cell reselection procedure, the wireless terminal 1 that handles coverage enhancement may not apply the reception-level offset and the quality-level offset (or may apply these offsets that are considered as zero) to cells for which it is unclear whether the cells support coverage enhancement.

In the cell reselection procedure, the wireless terminal 1 that handles coverage enhancement may consider that one or both of the reception-level offset and the quality-level offset are infinite with respect to cells whose reception-level offset and the quality-level offset are not notified based on system information (including neighboring cell list information) and/or cells for which it is unclear whether the cells support coverage enhancement. In this case, in the wireless terminal 1, these unclear cells always fulfill $S_{rxlev}<0$ and $S_{qual}<0$, and do not fulfill criteria for the cell selection evaluation.

The base station 2 may indicate whether a cell is a cell that supports coverage enhancement based on neighboring cell list information included in system information (e.g., SIB4, SIB5, or SIB21) to the wireless terminal 1. For example, the base station 2 may indicate whether a cell listed in the neighboring cell list information is a cell that supports coverage enhancement based on information elements such as identifiers or cell IDs to the wireless terminal 1 for each cell listed in the neighboring cell list information. The base station 2 may also implicitly indicate that a cell is a cell that supports coverage enhancement to the wireless terminal 1 by transmitting neighboring cell list information including one or all of information elements of information indicating the reception-level offset, information indicating the quality-level offset, and other information elements that relate to coverage enhancement.

The wireless terminal 1 may determine whether a cell is a cell that supports coverage enhancement based on information elements such as identifiers included in system information (including the neighboring cell list information) or cell IDs. The wireless terminal 1 may also determine that a cell transmitting system information including one of information elements such as information indicating the reception-level offset, information indicating the quality-level offset, or other information elements that relate to coverage enhancement is a cell that supports coverage enhancement.

Parameters (cell-reselection parameters) used for the criteria for cell selection evaluation in cell reselection, that is, parameters included in system information that relates to cell reselection, will be described.

In cell reselection, in order to avoid unnecessary measurement of cells for the same frequency, the wireless terminal 1 may not perform intra-frequency measurement in cases where results ($S_{rxlev}$, $S_{qual}$) according to criteria for cell selection evaluation on a cell that is being camped on (a serving cell) are better than certain threshold values (S_IntraSearchP, S_IntraSearchQ). Specifically, in cases where both relationships in Equations (8), $S_{rxlev}>$S_IntraSearch$P$; and $S_{qual}>$S_IntraSearch$Q$ \hfill (8)

are fulfilled, the wireless terminal 1 may not perform intra-frequency measurement. On the other hand, in cases where the results according to criteria for cell selection evaluation do not fulfill Equations (8), the wireless terminal 1 performs intra-frequency measurement on at least another cell.

Alternatively, the wireless terminal 1 may use, as the threshold values for Equations (8), threshold values (S_IntraSearchP_ce, S_IntraSearchQ_ce) for cell reselection corresponding to coverage enhancement. In this case, if the result fulfills both relationships in Equations (9), $S_{rxlev}>$S_IntraSearch$P$_ce; and $S_{qual}>$S_IntraSearch$Q$_ce \hfill (9)

the wireless terminal 1 may be designed not to perform intra-frequency measurement.

In order to avoid unnecessary measurement on cells with frequencies (different frequencies) different from that of the serving cell, the wireless terminal 1 may perform no inter-frequency measurement in cases where results ($S_{rxlev}$, $S_{qual}$) according to criteria for the cell selection evaluation on the serving cell are better than threshold values (S_nonIntraSearchP, S_nonIntraSearchQ). Specifically, in cases where both relationships in Equations (10), $S_{rxlev}>$S_nonIntraSearch$P$; and $S_{qual}>$S_nonIntraSearch$Q$ \hfill (10)

are fulfilled, the wireless terminal 1 may perform no inter-frequency measurement. On the other hand, in cases where the results according to criteria for the cell selection evaluation do not fulfill Equations (10), the wireless terminal 1 performs inter-frequency measurement on at least another cell with a different frequency.

Alternatively, the wireless terminal 1 may use, as the threshold values of Equations (10), threshold values (S_nonIntraSearchP_ce, S_nonIntraSearchQ_ce) for cell reselection corresponding to coverage enhancement. In this case, if both relationships in Equations (11) defined as:

$S_{rxlev}>$S_nonIntraSearch$P$_ce; and $S_{qual}>$S_nonIntraSearch$Q$_ce \hfill (11)

are fulfilled, the wireless terminal 1 may be designed not to perform intra-frequency measurement.

The wireless terminal 1 may determine whether to perform cell reselection on neighboring cells with frequencies of higher priority than the frequency of the serving cell or other RATs by using threshold values (Thresh_X, HighP) with respect to receive power of a cell with a frequency of higher priority or threshold values (Thresh_X, HighQ) with respect to receive quality of a cell with a frequency of higher priority.

Specifically, in cases where these threshold values are included in system information (e.g., system information block type 3: SIB3), the wireless terminal 1 applies Equation (12) defined as:

$S_{qual}>$Thresh_$X$,High$Q$ \hfill (12)

to cells with different frequencies of EUTRAN or cells with frequencies of UTRAN FDD, and applies Equation (13) defined as:

$S_{rxlev}>$Thresh_$X$,High$P$ \hfill (13)

to cells with other frequencies (e.g., UTRAN TDD, GSM/EDGE radio access network (GERAN), CDMA2000 1×RTT, and HRPD).

The wireless terminal 1 that handles coverage enhancement may use, as the threshold values of Equation (12) or (13), threshold values (Thresh_X, HighQ_ce, Thresh_X, HighP) for cell reselection corresponding to coverage enhancement.

The wireless terminal 1 determines whether to perform cell reselection to a neighboring cell with lower priority frequency than the serving cell frequency or other RATs by using threshold values (Thresh_X, LowP) with respect to receive power of a cell with lower priority frequency or threshold values (Thresh_X, LowQ) with respect to receive quality of a cell with lower priority frequency.

Specifically, in cases where these threshold values are included in system information (e.g., system information block type 3, SIB3), the wireless terminal 1 applies Equations (14) defined as:

$S_{qual,s}$<Thresh_serving,LowQ; and $S_{qual,n}$>Thresh_X,LowQ     (14)

to cells of different frequencies of EUTRAN or cells with frequencies of UTRAN FDD, and applies Equations (15) defined as:

$S_{qual,s}$<Thresh_serving,LowQ; and $S_{rxlev,n}$>Thresh_X,LowP     (15)

to cells with other frequencies (e.g., UTRAN TDD, GSM/EDGE radio access network (GERAN), CDMA2000 1×RTT, and HRPD).

In cases where these threshold values are not included in system information (e.g., system information block type 3, SIB3), Equations (16) defined as:

$S_{rxlev,s}$<Thresh_serving,LowP; and $S_{rxlev,n}$>ThreshX,LowP     (16)

are applied.

In the expressions above, $S_{qual,s}$ and $S_{rxlev,s}$ are respectively $S_{qual}$ and $S_{rxlev}$ of the serving cell, and $S_{qual,n}$ and $S_{rxlev,n}$ are respectively $S_{qual}$ and $S_{rxlev}$ of a neighboring cell.

The wireless terminal 1 that handles coverage enhancement may use, as the threshold values of Equations (14) through (16), threshold values (Thresh_serving, LowQ_ce, Thresh_serving, LowP_ce, Thresh_X, LowQ_ce, Thresh_X, and LowP_ce) for cell reselection corresponding to coverage enhancement, instead of corresponding parameters in the expressions.

The base station 2 provides notification of frequency priority information with respect to each frequency through system information. In this notification, second frequency priority information to be applied to the wireless terminal 1 supporting coverage enhancement as well as first frequency priority information to be applied to the ordinary wireless terminal 1 may be included in the third or fourth system information for transmission.

Once having camped on a cell for coverage enhancement, the wireless terminal 1 that handles coverage enhancement may consider that frequency priority of the same frequency as that of the cell in which the wireless terminal 1 has camped in is the highest priority. When detecting a cell for coverage enhancement, the wireless terminal 1 that handles coverage enhancement may consider that frequency priority of the same frequency as that of the detected cell is the highest priority.

This configuration enables the wireless terminal 1 that supports coverage enhancement to perform cell reselection based on criteria for cell selection evaluation corresponding to coverage enhancement by using system information of the base station 2 (cell) that supports coverage enhancement. The base station2 transmits system information indicating that the base station 2 supports coverage enhancement as neighboring cell information, thereby enabling the wireless terminal 1 that supports coverage enhancement to perform cell reselection based on criteria for cell selection evaluation corresponding to coverage enhancement.

The wireless terminal 1 determines whether to support coverage enhancement with respect to a neighboring cell as a candidate of cell reselection, based on information elements included in system information of the base station 2, and performs cell reselection by using suitable criteria for cell selection evaluation. Thus, cells that do not support coverage enhancement are not reselected so that cell reselection can be efficiently performed. The base station 2 transmits system information of the base station 2 including neighboring cell information indicating whether a cell supports coverage enhancement, thereby enabling the wireless terminal 1 to perform efficient cell reselection using suitable criteria for cell selection evaluation.

In the foregoing embodiments, functionality of the base station 2 may be implemented by other devices. For example, a relay station device wirelessly connected to the base station 2 may implement the functionality.

In the foregoing embodiments, MTCUE has been described as an example of a wireless terminal of a new (enhanced) type (or category) that does not have a large number of functions (features) unlike wireless terminals handling LTE or LTE-Advanced but has only limited functions (features). However, the present invention is not limited to MTCUE, and is applicable to current or future wireless terminals (including, for example, base stations, integrated circuits, and communication systems thereof) that perform coverage enhancement (repetitive transmission or repetitive reception) of cells.

The foregoing embodiments are merely examples, and may be variously modified or replaced with other examples. For example, transmission models used herein are also applicable to a communication system that uses a frequency division duplex (FDD) mode, a time division duplex (TDD) mode, or both of the transmission modes for each frequency. The names of parameters and operations used in the embodiments are assigned for convenience of description. Even if the names used in the embodiments differ from those actually used in application, this difference does not affect the effect of the invention supported by the embodiments.

For example, the number of repetitions (repetition count) of transmission and/or reception for coverage enhancement may be replaced by a repetition level, a coverage enhancement level, a coverage level, an enhancement coefficient (factor), an enhancement level, a repetition level, a repetition coefficient, an enhancement repetition coefficient, a bundling size, a bundling coefficient, a trial count, a trial level, an attempt level, or other synonymous expressions.

The term "connection" used in the embodiments refers not only to direct connection using physical lines between one device and another, but also to a logical connection and wireless connection using wireless technology.

The specific numerical values used in the embodiments are merely examples for convenience of description, and any other suitable values may be used.

The wireless terminals 1 are not limited to portable or movable mobile station terminals, and may be stationary or immovable electronic equipment placed outdoors, such as AV equipment, kitchen utilities, cleaning/washing equipment, air-conditioning equipment, office equipment, vending machines, other daily appliances and measurement equipment, on-vehicle equipment, and equipment with the function of communicating with, for example, wearable equipment or healthcare equipment. The wireless terminals 1 may be used not only for machine-to-machine communication (machine type communication) but also for communications between person and person, person and equipment, vehicle and person, vehicle and vehicle, and a building on road and vehicle (road-vehicle communication).

The wireless terminal 1 may also be referred to as a user terminal, a mobile station terminal, a communication terminal, mobile equipment, a terminal, user equipment (UE), or a mobile station (MS). The base station 2 may also be referred to as a wireless base station apparatus, a base station, a wireless base station, a fixed station, a Node B (NB), an evolved Node B (eNB), a base transceiver station (BTS), or a base station (BS).

The base station 2 is referred to as an NB in UMTS defined by the 3GPP, and as an eNB in EUTRA and Advanced EUTRA. The wireless terminal 1 in UMTS defined by the 3GPP, EUTRA, and Advanced EUTRA is referred to as UE.

For convenience of description, methods, means, or steps of algorithms for implementing functions of the wireless terminal 1 and the base station 2 or some of the functions are specifically combined with reference to functional block diagrams. These methods, means, and steps of algorithms can be directly implemented by using hardware, a software module executed by a processor, or a combination thereof.

In the case of implementation by hardware, the wireless terminal 1 and the base station 2 include a power supply device or a battery for supplying power to the wireless terminal 1 or the base station 2, a display device such as a liquid-crystal display device and a display driver, a memory, an input/output interface and input/output terminals, a loudspeaker, and other peripheral devices, in addition to the components illustrated in the block diagrams.

In the case of implementation by software, the functionality of the software can be stored or transmitted as one or more commands or codes on a computer-readable medium. The computer-readable medium covers both a communication medium and a computer recording medium that help portability of a computer program from one place to another.

The wireless terminal 1 and the base station 2 may be controlled by recording one or more commands or codes on a computer-readable recording medium, causing a computer system to read the one or more commands or codes recorded on the recording medium, and executing the one or more commands or codes. The "computer system" as used herein includes OS and hardware such as peripheral equipment.

The operations described in the embodiments of the present invention may be implemented by programs. Programs executed by the wireless terminal 1 and the base station 2 in the embodiments are programs (programs for causing a computer to operate) for controlling a CPU and other components so as to implement functionality of the embodiments. Information handled by these devices are temporarily accumulated in a RAM, and then stored in various ROMs or HDDs, read out by a CPU when necessary, and is modified or written.

The functionality of the embodiments can be implemented not only by executing programs but also by, in some cases, processing the programs in cooperation with an operating system or other application programs, for example, based on the instruction of the programs.

A "computer-readable recording medium" refers to a portable medium such as a semiconductor medium (e.g., a RAM or a nonvolatile memory card), an optical recording medium (e.g., a DVD, an MO, an MD, a CD, or a BD), a magnetic recording medium (e.g., a magnetic tape or a flexible disk), or a memory device such as a disk unit incorporated in a computer system. The "computer-readable recording medium" includes a component that dynamically holds a program for a short period of time, such as a communication line for transmitting a program via a network such as the Internet or a communication line such as a telephone line and a component that temporarily holds a program during a limited time, such as a volatile memory in a computer system serving as a server or a client.

The program may be used for implementing some of the functions described above, and may be used for implementing the functions when being combined with a program already recorded in a computer system.

The functional blocks or features of the wireless terminal 1 and the base station 2 used in the foregoing embodiments can be implemented or executed by a general-purpose processor designed for obtaining at least the functions described above, a digital signal processor (DSP), an application-specific integrated circuit (ASIC) or an optional general-purpose integrated circuit (IC), a field programmable gate array (FPGA) signal or another programmable logical device, a discrete gate or a transistor logic, a discrete hardware part, or a combination thereof.

The general-purpose processor may be a microprocessor, and alternatively, the processor may be a conventional processor, a controller, a microcontroller, or a state machine. Each of the general-purpose processor or the circuits described above may be a digital circuit or an analog circuit or may include both of the digital and analog circuits.

The processor may be mounted as a combination of computing devices. For example, the processor may be a combination of a DSP and a microprocessor, a combination of a plurality of microprocessors, a combination of a DSP core and one or more connected microprocessors, or a combination of such components.

Although the embodiments of the present invention have been described with reference to the specific examples, it is apparent that the effect of the embodiments and the scope of the claims are not limited to these specific examples, and design change, for example, may be expected within the scope of the invention. That is, the description of the specification is intended to describe illustrative examples, and is not intended to limit the embodiments of the invention.

The present invention may be variously modified within the scope of the claims, and embodiments obtained by appropriately combining technical features disclosed in different embodiments fall within the technical range of the invention. Components and configurations obtained by replacing components providing similar advantages are also included in the technical range of the invention.

LEGEND

1: terminal device (e.g., wireless terminal)
2: base station
101, 201: receivers
102, 202: demodulators
103, 203: decoders
104, 204: receive-data controllers
105, 205: physical layer controllers
106, 206: transmit-data controllers
107, 207: encoders
108, 208: modulators 109, 209: transmitters
110, 210: radio resource controllers
211: network signal transceiver
T01, T02: transmit antenna
R01, R02: receive antenna

The invention claimed is:

1. A terminal that communicates with a base station, the terminal comprising:
   a receiver that receives system information, which includes cell-selection parameters for coverage enhancement; and
   a controller that considers a cell as a barred cell that the terminal is not permitted to select in a cell selection, in a case that the terminal could not acquire the system information, and applies the cell-selection parameters for coverage enhancement to cell-selection criterion in a case that the terminal could acquire the system information, wherein the cell-selection parameters are applied based on a cell measurement, wherein
   the cell-selection criterion is whether $S_{rxlev}>0$ and $S_{qual}>0$, where:

$$S_{rxlev}=Q_{rxlevmeas}-(Q_{rxlevmin}+Q_{rxlevminoffset})-P_{compensation}-Q_{offsettemp}; \text{ and}$$

$$S_{qual}=Q_{qualmeas}-(Q_{qualmin}+Q_{qualminoffset})-Q_{offsettemp},$$
   and in a case that the terminal acquires the system information, $Q_{qualmin\_CE}$ is applied instead of $Q_{rxlevmin}$ and $Q_{qualmin\_CE}$ is applied instead of $Q_{qualmin}$, wherein
   $Q_{rxlevmeas}$ is a Reference Signal Received Power (RSRP) measurement result,
   $Q_{rxlevmin}$ is a conventional minimum required reception level,
   $Q_{rxlevminoffset}$ is an offset value for minimum required reception level,
   $P_{compensation}$ is a maximum-transmission-power level compensation value,
   $Q_{offsettemp}$ is a temporary offset value,
   $Q_{qualmeas}$ is a Reference Signal Received Quality (RSRQ) measurement result,
   $Q_{qualmin}$ is a conventional minimum required quality level,
   $Q_{qualminoffset}$ is an offset value for minimum required quality level,
   $Q_{rxlevmin\_CE}$ is a minimum required reception level, and
   $Q_{qualmin\_CE}$ is a minimum required quality level.

2. The terminal according to claim 1, wherein the barred cell is not selected as a suitable cell in which the terminal camps in order to receive normal services.

3. The terminal according to claim 1, wherein the barred cell is not selected as an acceptable cell in which the terminal camps in order to receive restricted services.

4. A base station that communicates with a terminal, the base station comprising:
   a controller that sets system information which includes cell-selection parameters for coverage enhancement; and
   a transmitter that transmits the system information, wherein
   a cell is considered as a barred cell that the terminal is not permitted to select in a cell selection, in a case that the terminal could not acquire the system information; and
   the cell-selection parameters for coverage enhancement are applied to cell-selection criterion in a case that the terminal could acquire the system information, wherein the cell-selection parameters are applied based on a cell measurement, wherein
   the cell-selection criterion is whether $S_{rxlev}>0$ and $S_{qual}>0$, where:

$$S_{rxlev}=Q_{rxlevmeas}-(Q_{rxlevmin}+Q_{rxlevminoffset})-P_{compensation}-Q_{offsettemp}; \text{ and}$$

$$S_{qual}=Q_{qualmeas}-(Q_{qualmin}+Q_{qualminoffset})-Q_{offsettemp},$$
   and in a case that the terminal acquires the system information, $Q_{qualmin\_CE}$ is applied instead of $Q_{rxlevmin}$ and $Q_{qualmin\_CE}$ is applied instead of $Q_{qualmin}$, wherein
   $Q_{rxlevmeas}$ is a Reference Signal Received Power (RSRP) measurement result,
   $Q_{rxlevmin}$ is a conventional minimum required reception level,
   $Q_{rxlevminoffset}$ is an offset value for minimum required reception level,
   $P_{compensation}$ is a maximum-transmission-power level compensation value,
   $Q_{offsettemp}$ is a temporary offset value,
   $Q_{qualmeas}$ is a Reference Signal Received Quality (RSRQ) measurement result,
   $Q_{qualmin}$ is a conventional minimum required quality level,
   $Q_{qualminoffset}$ is an offset value for minimum required quality level,
   $Q_{rxlevmin\_CE}$ is a minimum required reception level, and
   $Q_{qualmin\_CE}$ is a minimum required quality level.

5. The base station according to claim 4, wherein the barred cell is not selected as a suitable cell in which the terminal camps in order to receive normal services.

6. The base station according to claim 4, wherein the barred cell is not selected as an acceptable cell in which the terminal camps in order to receive restricted services.

7. A communication system comprising:
   a terminal and a base station,
   the base station communicating with the terminal, the base station comprising:
      a transmitter that transmits system information which includes cell-selection parameters for coverage enhancement; and
   the terminal communicating with the base station, the terminal comprising:
      a receiver that receives the system information; and
      a controller that considers a cell as a barred cell that the terminal is not permitted to select in a cell selection, in a case that the terminal could not acquire the system information, and applies the cell-selection parameters for coverage enhancement to cell-selection criterion in a case that the terminal could acquire the system information, wherein the cell-selection parameters are applied based on a cell measurement, wherein
      the cell-selection criterion is whether $S_{rxlev}>0$ and $S_{qual}>0$, where:

$$S_{rxlev}=Q_{rxlevmeas}-(Q_{rxlevmin}+Q_{rxlevminoffset})-P_{compensation}-Q_{offsettemp}; \text{ and}$$

$$S_{qual}=Q_{qualmeas}-(Q_{qualmin}+Q_{qualminoffset})-Q_{offsettemp},$$
      and in a case that the terminal acquires the system information, $Q_{qualmin\_CE}$ is applied instead of $Q_{rxlevmin}$ and $Q_{qualmin\_CE}$ is applied instead of $Q_{qualmin}$, wherein $Q_{rxlevmeas}$ is a Reference Signal Received Power (RSRP) measurement result, $Q_{rxlevmin}$ is a conventional minimum required reception level, $Q_{rxlevminoffset}$ is an offset value for minimum required reception level, $P_{compensation}$ is a maximum-transmission-power level compensation value, $Q_{offsettemp}$ is a temporary offset value, $Q_{qualmeas}$ is a Reference Signal Received Quality (RSRQ) measurement result, $Q_{qualmin}$ is a conventional minimum required quality level, $Q_{qualminoffset}$ is an offset value for minimum required quality level, $Q_{rxlevmin\_CE}$ is a minimum required reception level, and $Q_{qualmin\_CE}$ is a minimum required quality level.

8. A communication method performed by a terminal that communicates with a base station, the terminal comprising a receiver and a controller, the communication method comprising:

via the receiver, receiving system information which includes cell-selection parameters for coverage enhancement; and via the controller, considering a cell as a barred cell that the terminal is not permitted to select in a cell selection, in a case that the terminal could not acquire the system information and via the controller, applying the cell-selection parameters for coverage enhancement to cell-selection criterion in a case that the terminal could acquire the system information, wherein the cell-selection parameters are applied based on a cell measurement, wherein the cell-selection criterion is whether $S_{rxlev}>0$ and $S_{qual}>0$, where:

$$S_{rxlev}=Q_{rxlevmeas}-(Q_{rxlevmin}+Q_{rxlevminoffset})-P_{compensation}-Q_{offsettemp}; \text{ and}$$

$$S_{qual}=Q_{qualmeas}-(Q_{qualmin}+Q_{qualminoffset})-Q_{offsettemp},$$
and in a case that the terminal acquires the system information, $Q_{qualmin\_CE}$ is applied instead of $Q_{rxlevmin}$ and $Q_{qualmin\_CE}$ is applied instead of $Q_{qualmin}$, wherein $Q_{rxlevmeas}$ is a Reference Signal Received Power (RSRP) measurement result, $Q_{rxlevmin}$ is a conventional minimum required reception level, $Q_{rxlevminoffset}$ is an offset value for minimum required reception level, $P_{compensation}$ is a maximum-transmission-power level compensation value, $Q_{offsettemp}$ is a temporary offset value, $Q_{qualmeas}$ is a Reference Signal Received Quality (RSRQ) measurement result, $Q_{qualmin}$ is a conventional minimum required quality level, $Q_{qualminoffset}$ is an offset value for minimum required quality level, $Q_{rxlevmin\_CE}$ is a minimum required reception level, and $Q_{qualmin\_CE}$ is a minimum required quality level.

9. A communication method performed by a base station that communicates with a terminal, the base station comprising a controller and a transmitter, the communication method comprising:

via the controller, setting system information which includes cell-selection parameters for coverage enhancement; and via the transmitter, transmitting the system information, wherein a cell is considered as a barred cell in a case that the terminal could not acquire the system information, and the cell-selection parameters for coverage enhancement are applied to cell-selection criterion in a case that the terminal could acquire the system information, wherein the cell-selection parameters are applied based on a cell measurement, wherein the cell-selection criterion is whether $S_{rxlev}>0$ and $S_{qual}>0$, where:

$$S_{rxlev}=Q_{rxlevmeas}-(Q_{rxlevmin}+Q_{rxlevminoffset})-P_{compensation}-Q_{offsettemp}; \text{ and}$$

$$S_{qual}=Q_{qualmeas}-(Q_{qualmin}+Q_{qualminoffset})-Q_{offsettemp},$$
and in a case that the terminal acquires the system information, $Q_{qualmin\_CE}$ is applied instead of $Q_{rxlevmin}$ and $Q_{qualmin\_CE}$ is applied instead of $Q_{qualmin}$, wherein $Q_{rxlevmeas}$ is a Reference Signal Received Power (RSRP) measurement result, $Q_{rxlevmin}$ is a conventional minimum required reception level, $Q_{rxlevminoffset}$ is an offset value for minimum required reception level, $P_{compensation}$ is a maximum-transmission-power level compensation value, $Q_{offsettemp}$ is a temporary offset value, $Q_{qualmeas}$ is a Reference Signal Received Quality (RSRQ) measurement result, $Q_{qualmin}$ is a conventional minimum required quality level, $Q_{qualminoffset}$ is an offset value for minimum required quality level, $Q_{rxlevmin\_CE}$ is a minimum required reception level, and $Q_{qualmin\_CE}$ is a minimum required quality level.

10. A non-transitory computer-readable medium storing a series of functions that, when executed by an integrated circuit mounted in a terminal that communicates with a base station, the terminal comprising a receiver and a controller, causes the terminal to perform the functions comprising:

via the receiver, receiving system information which includes cell-selection parameters for coverage enhancement;

via the controller, considering a cell as a barred cell that the terminal is not permitted to select in a cell selection, in a case that the terminal could not acquire the system information; and via the controller, applying the cell-selection parameters for coverage enhancement to cell-selection criterion in a case that the terminal could acquire the system information, wherein the cell-selection parameters are applied based on a cell measurement, wherein the cell-selection criterion is whether $S_{rxlev}>0$ and $S_{qual}>0$, where:

$$S_{rxlev}=Q_{rxlevmeas}-(Q_{rxlevmin}+Q_{rxlevminoffset})-P_{compensation}-Q_{offsettemp}; \text{ and}$$

$S_{qual}=Q_{qualmeas}-(Q_{qualmin}+Q_{qualminoffset})-Q_{offsettemp}$, and in a case that the terminal acquires the system information, $Q_{qualmin\_CE}$ is applied instead of $Q_{rxlevmin}$ and $Q_{qualmin\_CE}$ is applied instead of $Q_{qualmin}$, wherein $Q_{rxlevmeas}$ is a Reference Signal Received Power (RSRP) measurement result, $Q_{rxlevmin}$ is a conventional minimum required reception level, $Q_{rxlevminoffset}$ is an offset value for minimum required reception level, $P_{compensation}$ is a maximum-transmission-power level compensation value, $Q_{offsettemp}$ is a temporary offset value, $Q_{qualmeas}$ is a Reference Signal Received Quality (RSRQ) measurement result, $Q_{qualmin}$ is a conventional minimum required quality level, $Q_{qualminoffset}$ is an offset value for minimum required quality level, $Q_{rxlevmin\_CE}$ is a minimum required reception level, and $Q_{qualmin\_CE}$ is a minimum required quality level.

11. A non-transitory computer-readable medium storing a series of functions that, when executed by an integrated circuit mounted in a base station that communicates with a terminal, the base station comprising a controller and a transmitter, causes the base station to perform the functions comprising:

via the controller, setting system information which includes cell-selection parameters for coverage enhancement; and via the transmitter, transmitting the system information, wherein a cell is considered as a barred cell that the terminal is not permitted to select in a cell selection, in a case that the terminal could not acquire the system information, and the cell-selection parameters for coverage enhancement are applied to cell-selection criterion in a case that the terminal could acquire the system information, wherein the cell-selection parameters are applied based on a cell measurement, wherein the cell-selection criterion is whether $S_{rxlev}>0$ and $S_{qual}>0$, where:

$S_{rxlev}=Q_{rxlevmeas}-(Q_{rxlevmin}+Q_{rxlevminoffset})-P_{compensation}-Q_{offsettemp}$; and $S_{qual}=Q_{qualmeas}-(Q_{qualmin}+Q_{qualminoffset})-Q_{offsettemp}$, and in a case that the terminal acquires the system information, $Q_{qualmin\_CE}$ is applied instead of $Q_{rxlevmin}$ and $Q_{qualmin\_CE}$ is applied instead of $Q_{qualmin}$, wherein $Q_{rxlevmeas}$ is a Reference Signal Received Power (RSRP) measurement result, $Q_{rxlevmin}$ is a conventional minimum required reception level, $Q_{rxlevminoffset}$ is an offset value for minimum required reception level, $P_{compensation}$ is a maximum-transmission-power level compensation value, $Q_{offsettemp}$ is a temporary offset value, $Q_{qualmeas}$ is a Reference Signal Received Quality (RSRQ) measurement result, $Q_{qualmin}$ is a conventional minimum required quality level, $Q_{qualminoffset}$ is an offset value for minimum required quality level, $Q_{rxlevmin\_CE}$ is a minimum required reception level, and $Q_{qualmin\_CE}$ is a minimum required quality level.

* * * * *